United States Patent [19]

Spaulding et al.

[11] Patent Number: 5,539,540
[45] Date of Patent: Jul. 23, 1996

[54] METHOD AND ASSOCIATED APPARATUS FOR TRANSFORMING INPUT COLOR VALUES IN AN INPUT COLOR SPACE TO OUTPUT COLOR VALUES IN AN OUTPUT COLOR SPACE

[75] Inventors: Kevin E. Spaulding, Spencerport; Ron Gershon, Pittsford; James R. Sullivan, Spencerport; Richard N. Ellson, Rochester, all of N.Y.

[73] Assignee: Eastman Kodak Company, Rochester, N.Y.

[21] Appl. No.: 305,861

[22] Filed: Sep. 13, 1994

Related U.S. Application Data

[63] Continuation of Ser. No. 17,198, Feb. 12, 1993, abandoned.

[51] Int. Cl.[6] .................... G03F 3/08; H04N 1/46
[52] U.S. Cl. .................. 358/518; 358/501; 358/520; 382/167
[58] Field of Search .................. 358/501, 504, 358/515, 518, 520, 525, 500; 382/162, 167; 395/131

[56] References Cited

U.S. PATENT DOCUMENTS

| | | | |
|---|---|---|---|
| 4,464,677 | 8/1984 | Khun et al. | 358/75 |
| 4,477,833 | 10/1984 | Clark et al. | 358/80 |
| 4,500,919 | 2/1985 | Schreiber | 358/78 |
| 4,670,780 | 6/1987 | McManus et al. | 358/518 |
| 4,758,885 | 7/1988 | Sasaki et al. | 358/520 |
| 4,941,038 | 7/1990 | Walowit | 358/518 |
| 4,941,039 | 7/1990 | E'Errico | 358/80 |
| 4,945,406 | 7/1990 | Cok | 358/80 |
| 4,992,862 | 2/1991 | Gabor | 358/76 |
| 5,073,818 | 12/1991 | Iida | 358/80 |
| 5,081,529 | 1/1992 | Collette | 358/80 |
| 5,109,272 | 4/1992 | Kinoshita et al. | 358/75 |
| 5,121,198 | 6/1992 | Maronian | 358/76 |
| 5,237,409 | 8/1993 | Yamaguchi | 358/518 |

FOREIGN PATENT DOCUMENTS

| | | | |
|---|---|---|---|
| 0565283 | 10/1993 | European Pat. Off. | H04N 1/46 |
| 2213674 | 8/1989 | United Kingdom | H04N 1/46 |

OTHER PUBLICATIONS

B. J. Lindbloom, "Accurate Color Reproduction for Computer Graphics Applications", *Computer Graphics*, vol. 23, No. 3, Jul. 1989, pp. 117–126.

*Primary Examiner*—Edward L. Coles, Sr.
*Assistant Examiner*—Thomas D. Lee
*Attorney, Agent, or Firm*—Gordon M. Stewart

[57] ABSTRACT

This invention provides a method for mapping an input color space to an output color space in such a way that the color reproduction characteristics of the saturated colors can be adjusted in a custom manner, while maintaining the desired tone reproduction on the neutral axis. This is accomplished by defining independently a tone transformation and a transformation for a plurality of highly saturated colors. A transformation is formed for the remaining color values having the specified transforms for the neutral and saturated colors as boundary values. In the preferred embodiment multi-dimensional look-up tables are used to implement the transform.

26 Claims, 21 Drawing Sheets

METHOD AND ASSOCIATED APPARATUS FOR TRANSFORMING INPUT COLOR VALUES IN AN INPUT COLOR SPACE TO OUTPUT COLOR VALUES IN AN OUTPUT COLOR SPACE

This is a continuation of application Ser. No. 017,198, filed 12 Feb. 1993 now abandoned.

CROSS-REFERENCE TO RELATED APPLICATION

The present application is related to U.S. patent application Ser. No. 017,094 entitled, "Method for Cross-device Color Calibration and Enhancement Using Explicit Constraints" filed on even date as the present application and bearing the Assignee's Docket No. 66,561.

FIELD OF THE INVENTION

The present invention relates to the field of color calibration and color enhancement for digital imaging systems. More specifically the invention is directed to a technique for transforming one device-dependent color space to another device-dependent color space which transforming maintains the saturation of the primary colors and other saturated colors in the input color space.

BACKGROUND OF THE INVENTION

For color digital imaging systems, each step of the imaging chain (original scene, image capture, image storage, image transmission, soft display, hard copy display, etc.) will, in general, have different device-dependent color spaces, as well as different color gamuts. The term color gamut is generally used to refer to the range of colors which can be represented and/or displayed at some particular stage in the system. The color gamut of a display device may be quite different from the gamut of the image capture device and/or the gamut of colors in some original real world scene. Additionally, the gamut of colors which can be displayed with one device may be substantially different from the color gamut of some other device. For example, consider FIG. 1 which illustrates the color gamut of a typical RGB color video monitor, as compared to the gamut of a Kodak XL7700 color printer. The plot shows a slice through the gamuts in CIELAB color space at a lightness value of L*=50.0. The area of overlap for the two gamuts indicates the colors which can be produced on both devices. The regions that are inside only one of the curves represent colors that can be produced on one device, but not on the other. The color values that are outside both curves cannot be produced by either device. For this example, it can be seen that the video monitor can produce much more saturated blues than the thermal printer at this lightness level. The thermal printer, on the other hand, can produce more saturated yellows.

In many applications, it is necessary to take color image data which exists in a color space for one specific device, and transform it onto a color space for a different device. Because of the differences in the color spaces and the color gamuts of the various devices, several problems arise in this process. The first one is the matter of color calibration. That is, how do you specify the color on one device so that the perceived color matches that of another device? For example, one might have an image which is displayed on a video monitor and desire to create a print with the same perceived color reproduction. This problem is essentially one of transforming from one device-dependent color space to another. In the example just given, this would involve transforming from the monitor RGB space to the printer CMY(K) space. If all of the colors in the image are in the overlap region of the two color gamuts then this transformation is relatively straightforward and can be done using techniques such as multi-dimensional look-up-tables (see: W. F. Schreiber, "Color Reproduction System," U.S. Pat. No. 4,500,919, Feb. 19, 1985).

However, if some of the colors in the input color space are outside of the gamut of the output color space the problem is somewhat more complicated. The question then becomes what should be done with the out-of-gamut colors. Several different methods to handle this problem have been suggested in the past. Some of the more common approaches have been to maintain the hue angle and lightness for the out-of-gamut colors and clip the saturation to the gamut boundary, or to somehow compress the gamut so that the colors in the input image fit within the output color gamut (for example, see: R. S. Gentile, E. Walowit and J. P. Allebach, "A comparison of techniques for color gamut mismatch compensation," J. Imaging Technol. 16, 176–181 (1990)). FIGS. 2 and 3 illustrate the color errors which are introduced by clipping the saturation to the gamut boundary for the case of printing a video RGB image on a Kodak XL7700 thermal printer. FIG. 2 represents a horizontal plane in CIELAB space at a L* value of 65. FIG. 3 represents a vertical plane in CIELAB space at a hue angle of 330° (at this hue angle Green is to the left and Magenta is to the right). The tails of the vectors indicate the input color on the video monitor, and the heads of the vectors (which have the diamond symbols) indicate the color which is produced by the printer. The gamut boundaries for the monitor and the printer are also indicated on the graphs. For this example, the white point for the calculation of the CIELAB color values was taken to be the R=G=B=255 point for the monitor (which was color-balanced for D65), and paper white with the D65 illuminant for the printer. It can be seen from FIGS. 2 and 3 that colors which are in the overlap region of the two gamuts are reproduced with the same CIELAB coordinates to within the quantization limits of the devices. Colors outside the printer gamut are clipped to the gamut boundary, preserving both hue angle and lightness. Some classes of images, such as photographic scenes, contain very few out-of-gamut colors. As a result, the saturation clipping approach may yield quite acceptable results when applied to these images. However, for other classes of images, such as computer generated presentation graphics, a large percentage of the colors may be outside the output gamut. This is due to the fact that saturated colors are very appealing for many kinds of graphics such as pie charts, etc. For these types of images, using an approach which clips the saturation, or compresses the gamut, may yield quite unacceptable results due to the fact that the resulting images will be noticeably lower in saturation (i.e., the colors will appear to be more pastel, and less vibrant). Consequently, different techniques are necessary to transform the input color gamut into the output color space. Since this process usually involves modifying the colors in the image, rather than simply matching the colors from one device to another, this falls into the category of "color enhancement."

A principle reason for the mismatch in the gamut shapes for different devices is related to the difference in the primary colors of the devices. For example, the Blue "primary" of a printer (made by overlapping the Cyan and Magenta colorants) may have a very different lightness, saturation and even hue than the Blue phosphor of a video monitor. The term "primary color" is used loosely here to include the two-color combinations, as well as the single color device primaries. For a video monitor, the primary colors will be the Red, Green, and Blue single phosphor colors, as well as two phosphor combinations giving Cyan (Green plus Blue), Magenta (Red plus Blue), and Yellow (Red plus Green). For a subtractive color device, such as a thermal printer, the primary colors will be taken to be the Cyan, Magenta, and Yellow colorants, as well as the two colorant combinations giving Red (Magenta plus Yellow), Green (Cyan plus Yellow), and Blue (Cyan plus Magenta).

One approach to solving the gamut mismatch problem is to remap the colors in such a way that the primary colors of the input device will transform to the primary colors of the output device. This insures that the saturated colors on the first device are reproduced with the largest possible saturation on the second device even though the hue and/or lightness may be slightly different. The conventional approach to accomplish this is to make the amount of the colorants for the second device a simple function of the corresponding colorants of the first device, e.g., Cyan for the printer would be a function of the Red component of the monitor color. This is illustrated in FIG. 4. In practice, the functional dependence is usually implemented using three one-dimensional look-up tables. The actual form of the transforming function can be specified to perform some degree of tone-scale correction. One example of a transforming function is of the form:

$$C=(1-R^\gamma), M=(1-G^\gamma), Y=(1-B^\gamma) \tag{1}$$

where $\gamma$ is a parameter which can be used to adjust the image contrast. Color error maps corresponding to this approach are shown in FIGS. 5 and 6. It can be seen that, as expected, the saturated monitor colors have been transformed to the saturated printer colors. In fact, this approach will exactly transform the gamut of the first device into that of the second device. It has the disadvantage, however, that there are very few degrees of freedom available to make any adjustments to the color transforming. In general, if the function which determines the amount of the Cyan colorant is changed, colors within the entire color gamut will be affected. It is therefore not possible to change the tone reproduction of the Green colors without affecting the color reproduction of the Blue colors, etc. Although this approach does have the desired result of producing images with more saturated colors, it is not possible, in general, to determine a transformation which will have optimum results for all parts of color space. More degrees of freedom can be included in the system by adding interaction between the color channels using matrices, etc. (for example, see: Robert P. Collette, "Color and tone scale calibration system for a printer using electronically-generated input images," U.S. Pat. No. 5,081,529, Jan. 14, 1992), but with these approaches it is still not possible to localize corrections to the color reproduction with any high degree of flexibility.

A more robust approach would be to generate a multi-dimensional color-transforming function which transforms the coordinates of the input space into those of the output space. The amount of Cyan colorant for a printer would then be a function of all of the color channels of the input device. Such an approach has the advantage that it is possible to have "knobs" to adjust the appearance of certain colors without affecting other colors. Additionally, it is possible to control the amount of correction applied.

The present invention describes a method for forming a color-transformation function which will transform the colors in the input color space into the output color space in such a way that the saturated colors on the input device are transformed to the saturated colors on the output device, with the added flexibility of being able to make local adjustments to the color reproduction to obtain results which are optimum for an application. Thus the benefits of the above approach, using three one-dimensional tables to maximize the color saturation, are captured while taking advantage of the flexibility inherent to a digital imaging system.

SUMMARY OF THE INVENTION

This invention provides a method for transforming an input device-dependent color space to an output device-dependent color space in such a way that the color reproduction characteristics of the saturated colors can be adjusted in a custom manner while maintaining the desired tone reproduction on the neutral axis. The preferred embodiment of the invention provides 18 adjustable parameters which can be used to individually adjust the hue saturation and lightness of the 6 primary colors of the input device. Additional degrees-of-freedom can be added by including more control colors, or by generalizing the functionality. This method has the advantage of increased flexibility relative to the conventional approaches which utilize a series of one-dimensional look-up tables and/or matrices. More specifically, the preferred method of the present invention is a method for transforming input color values in an input color space to output color values in an output color space, comprising the steps of:

a) forming a transform for the input color values that are neutral;

b) forming a transform for transforming a plurality of highly saturated input color values to desired output color values;

c) forming a transform of the remaining colors using as boundary values the transform for input color values that are neutral, as formed in step a), and the transform for the highly saturated input color values, as formed in step b); and d) transforming input color values in the input color space to output color values in the output color space using the transforms formed in steps a), b), and c).

From the foregoing it can be seen that it is a primary object of the present invention to provide a method for transforming one device-dependent color space to another device-dependent color space while maintaining the saturation of the primary colors and other saturated colors in the another device-dependent color space.

It is another object of the present invention to provide a method of coupling an input color device to an output color device so as to provide improved color outputs.

Yet another object of the present invention is to provide a method for improving the transformation of the gamut of colors from an input device to the gamut of colors reproducible by an output device.

The aforementioned and other objects of the present invention will become more apparent when taken in conjunction with the following description and drawings, wherein like characters indicate like parts.

DETAILED DESCRIPTION OF THE INVENTION

Figure 7:
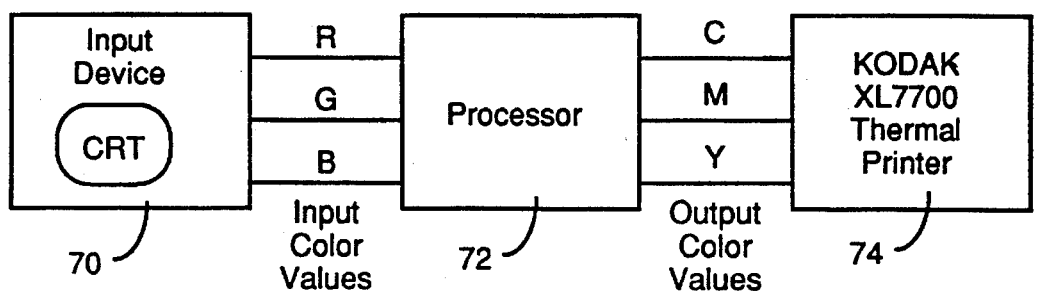
FIGS. 7 is a block diagram of a specific color transforming algorithm where the output color values are a function of all of the input color values.

Referring to FIG. 7, an input device 70, such as a computer which may include a CRT image display device, provides color values representive of the Red, Green, and Blue, components of a displayed image. The provided color values are processed in accordance with the steps of the present invention through a processor 72 to provide transformed output color values, Cyan, Magenta, and Yellow, that permit an output device 74, such as a KODAK XL7700 thermal printer, to reproduce the image in accordance with user preferences.

Figure 8:
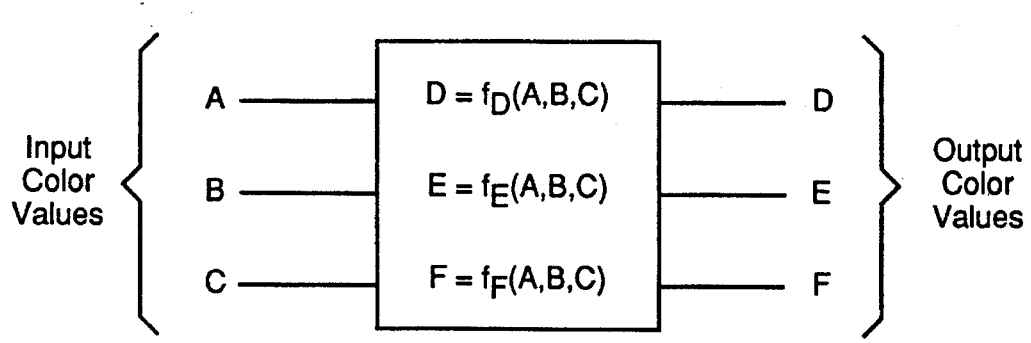
FIGS. 8 is a block diagram of a general color transforming algorithm where the output color values are a function of all of the input color values.

Referring to FIG. 8, in a generalized environment input color image data exists in some multi-channel device-dependent input color space, denoted as ABC, where ABC may represent RGB, CMY, CMYK, etc. It is desired to display the color image on a second device with some output color space, denoted as DEF, which may also represent RGB, CMY, CMYK, etc. In general, each of the output color values will be a function of all of the input color values. This can be represented functionally as:

$$D=f_D(A,B,C), E=f_E(A,B,C), F=f_F(A,B,C) \tag{2}$$

The color transformation functions $f_D$, $f_E$, and $f_F$ can be implemented using multi-dimensional look-up tables (with or without interpolation between the look-up table entries). It is a goal of this invention to define these color transformation functions in such a way that the saturated colors in the input color space are reproduced as saturated colors in the output color space. It is an additional goal of this invention to define the color transformation functions in such a way that there will be flexibility to adjust the color reproduction for different regions of color space independently.

Figure 4:
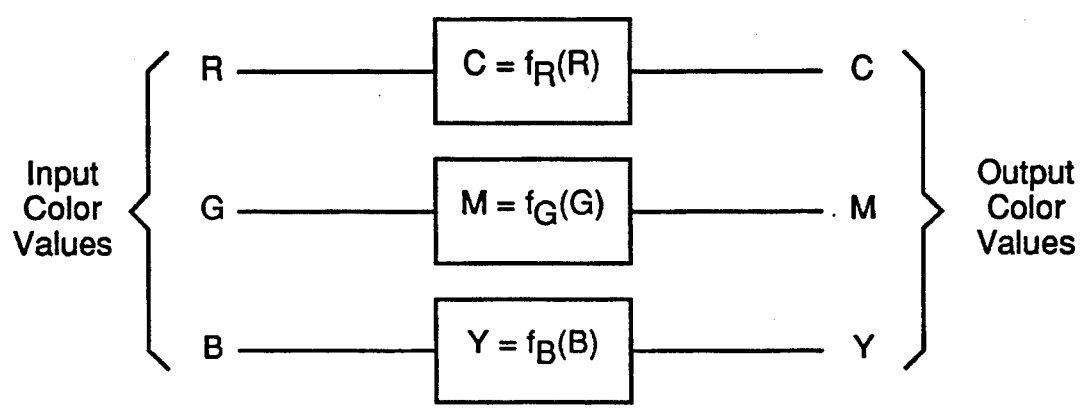
FIG. 4 is a block diagram of a prior art color transforming algorithm using three one-dimensional transforming functions to transform from an input color space, RGB, to an output color space, CMY.
Figure 5:
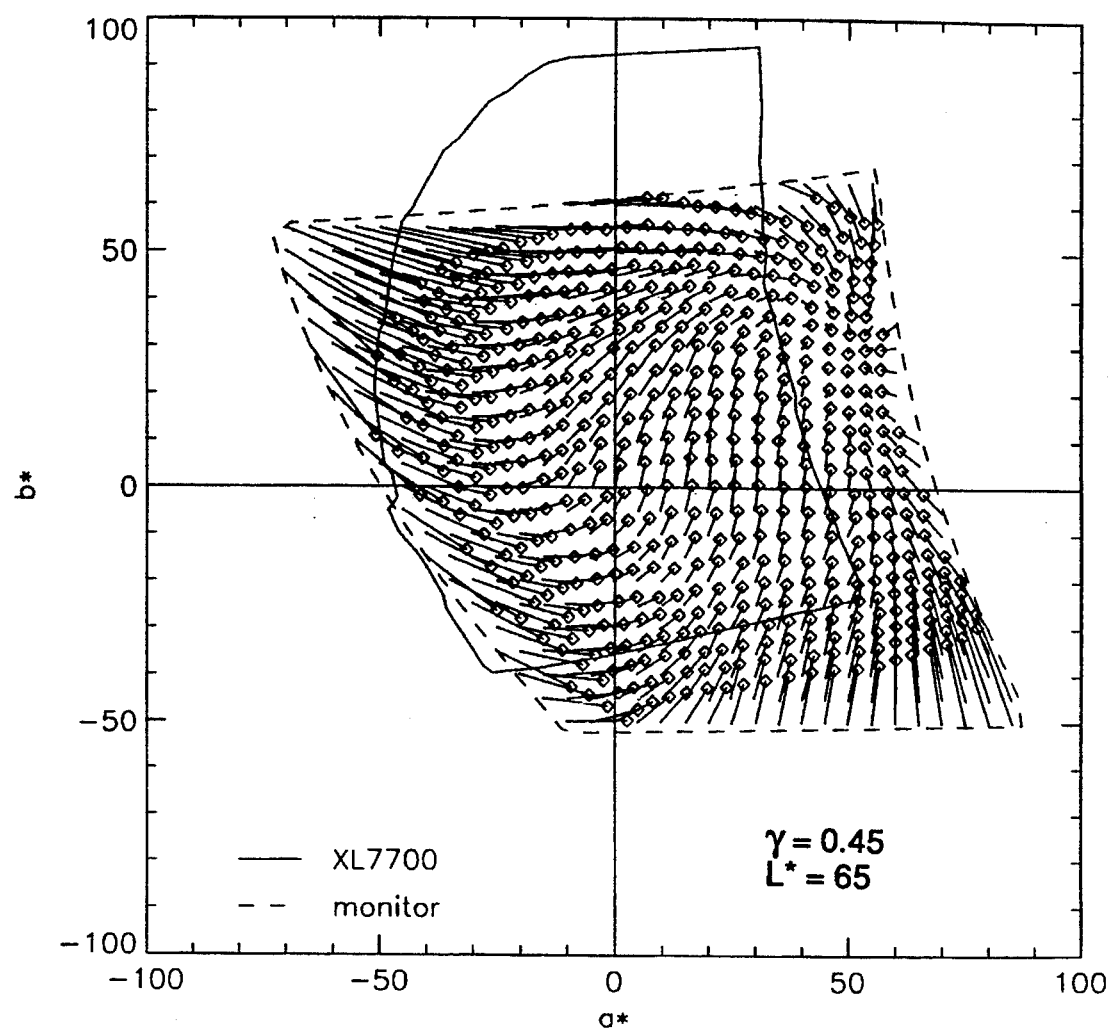
FIG. 5 is a plot showing the transforming of colors in the input video monitor gamut into colors in the Kodak XL7700 printer gamut using the one-dimensional functions in Eq. (1) with γ=0.45 at a lightness of L*=65.0.
Figure 6:
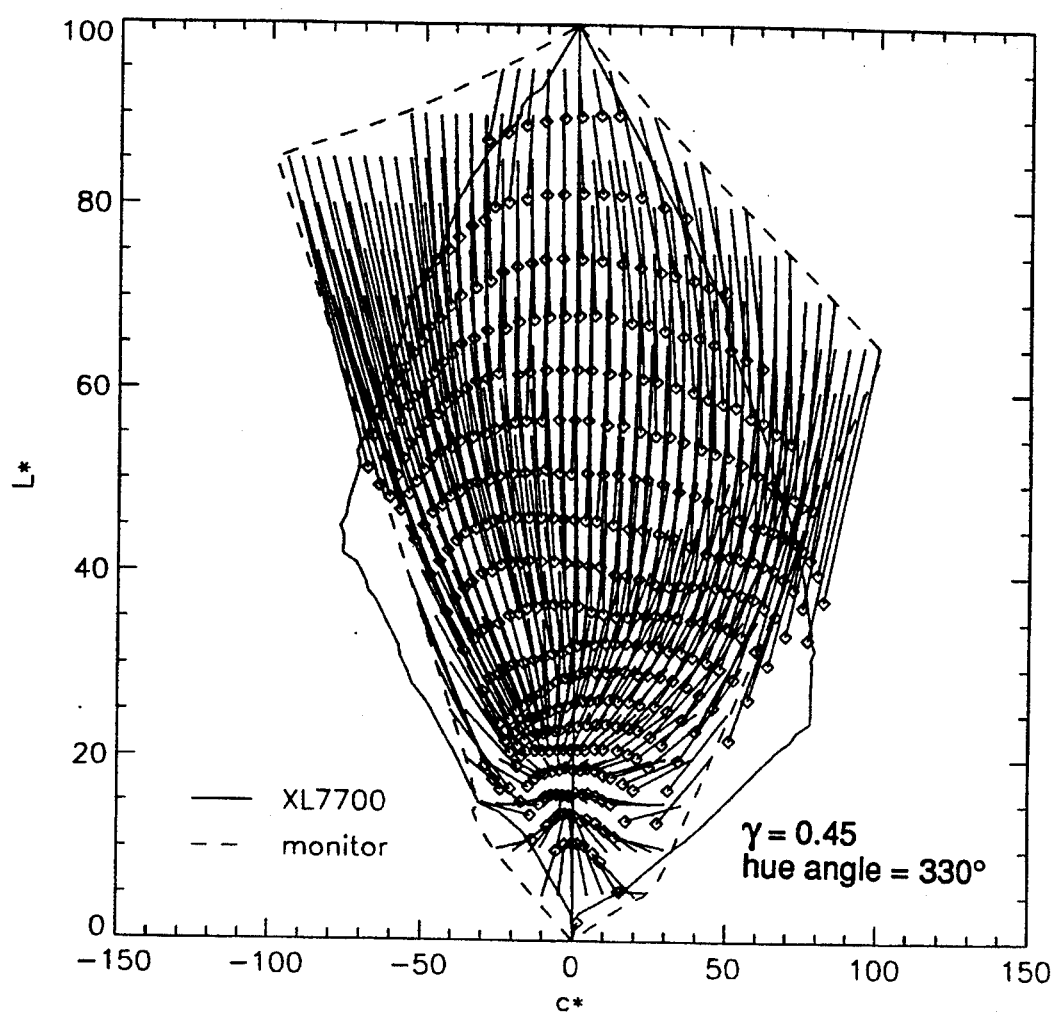
FIG. 6 is a plot showing the transforming of colors in the input video monitor gamut into colors in the Kodak XL7700 printer gamut using the one-dimensional functions in Eq. (1) with γ=0.45 at a hue angle of 330°.

FIG. 4 illustrates a set of color transforming functions which are a subset of the generalized color transforming functions shown in FIG. 7. In this case, the output color value for each of the color channels is only a function of the input color value for the corresponding color channel of the input color space. With this approach, the most saturated colors in the input color space will naturally be transformed to the most saturated colors of the output color space. This is because the primary colors of the input color space will be transformed to the primary colors of the output color space. The term "primary colors" here is used to refer to the single-color, and two-color combinations of the fundamental phosphors or colorants of the device, i.e., Red (R), Green (G), Blue (B), Cyan (C), Magenta (M), and Yellow (Y). However, since each output color value will only be a function of a single input color value there is very little flexibility with this approach to adjust the color reproduction characteristics of the system. Changing one of the color transforming functions will, in general, affect the color reproduction for the entire color volume. It is therefore not possible to change the hue of Red colors without also changing the hue of Green colors, etc. In this invention, we capture the desirable effects of this approach (i.e., preserving the saturation of the saturated input colors) while adding the flexibility to make local changes in the color reproduction characteristics. In particular we allow the specification of the tone reproduction of the neutral colors as well as the color reproduction for a series of saturated color values. These are used as boundary values to form a generalized color transformation for the remaining color values.

Figure 9:
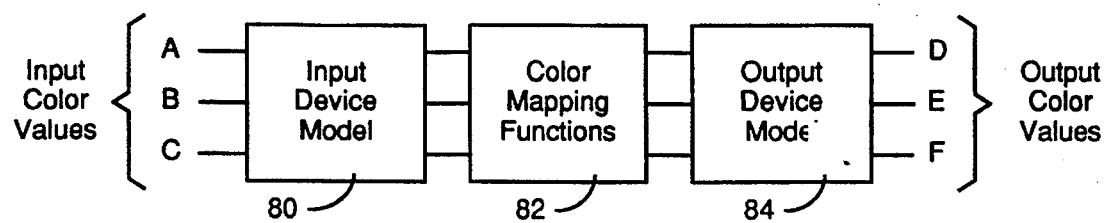
FIG. 9 is a block diagram showing a typical sequence of steps for a color transforming process.
Figure 10:
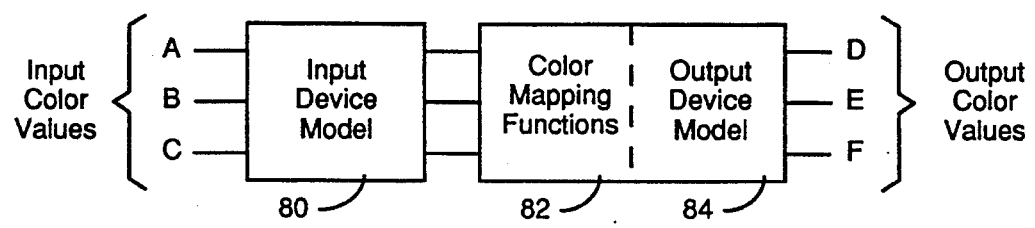
FIG. 10 is a block diagram which shows how a subset of the steps for the color transforming process can be combined into a single step.
Figure 11:
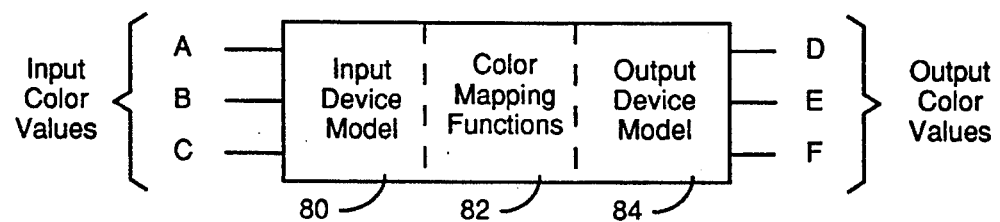
FIG. 11 is a block diagram which shows how all of the steps for the color transforming process can be combined into a single step.

FIG. 9 illustrates one enabling embodiment of the present invention. First, the device-dependent input color values, A, B, and C, specified in the input color space are transformed into device-independent color values in some device-independent color space using an input device model 80. The input device model 80 is a physical device model, or a multi-dimensional look-up table. Preferably, the device-independent color space is a perceptually uniform color space, such as CIELAB. The device-independent input color values are then transformed into device-independent output color values to be displayed on the output device using color transforming function 82. The device-independent output color values are then transformed into the device-dependent output color space, using an output device model 84, for display or printing on an output device 74. As with the input device model, the output device model is either a physical device model, or a multi-dimensional look-up table. The preferred embodiment of this invention involves transforming color images displayed on an RGB video monitor into images which can be printed on a CMY(K) color printer. It should be apparent, however, that this invention can be trivially adapted to other color conversion problems as well. It should also be apparent that in a particular implementation, several of the above steps could be combined into a single step. For example, the color transforming functions 82 and the output device model 84 may be combined as shown in FIG. 10, or all three may be combined as shown in FIG. 11. As these functions are combined, multi-dimensional look-up tables are built to store the output values as a function of the input values.

A preferred sequence of steps for the method of transforming input color values in an input color space to output color values in an output color space, comprising the steps of:

a) forming a transform for the input color values that are neutral;

b) forming a transform for transforming a plurality of highly saturated input color values to desired output color values;

c) forming a transform of the remaining colors using as boundary values the transform for input color values that are neutral, as formed in step a), and the transform for the highly saturated input color values, as formed in step b); and d) transforming input color values in the input color space to output color values in the output color space using the transforms formed in steps a), b), and c).

Figure 12:
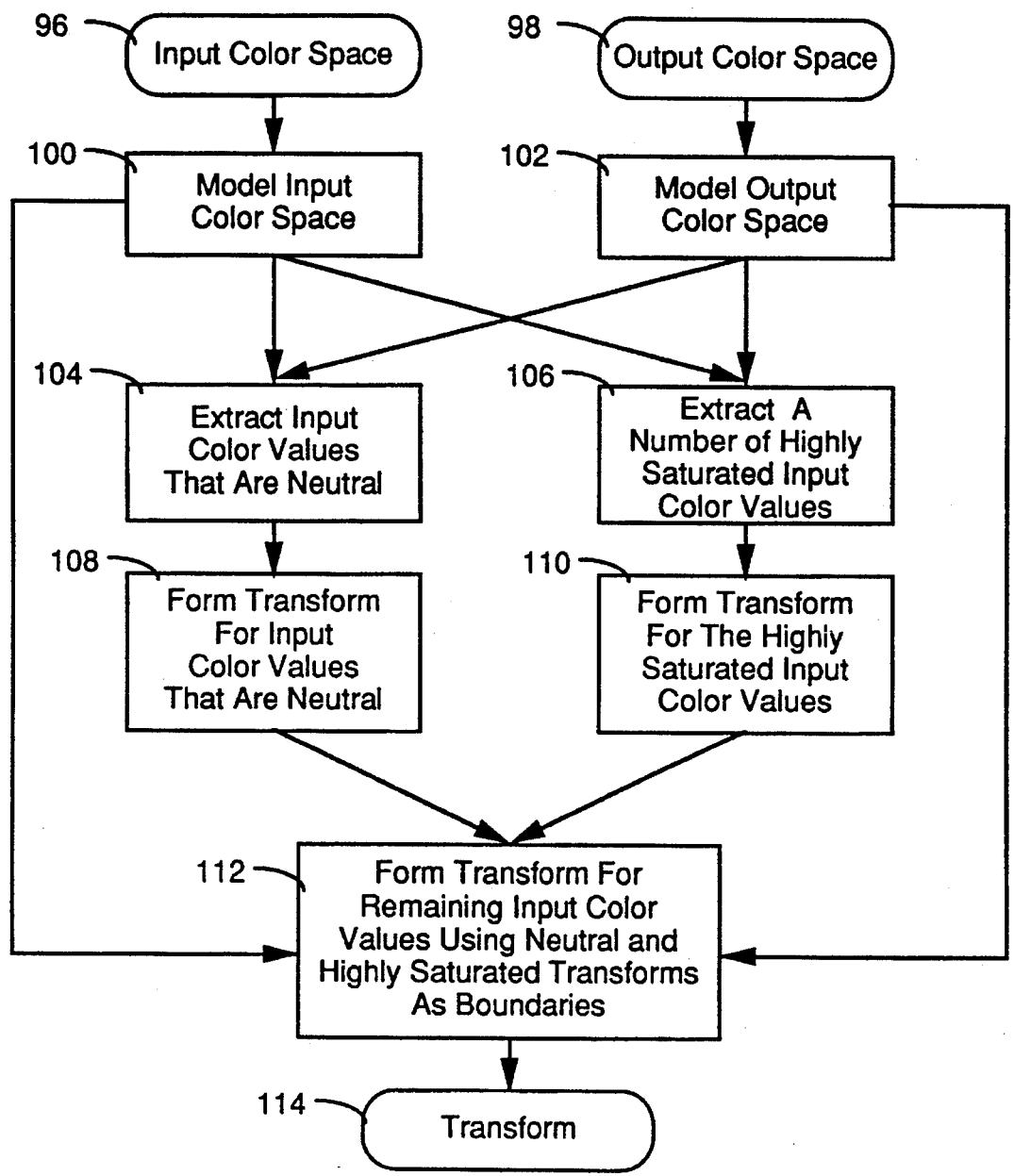
FIG. 12 is a flow diagram of the method of this invention.

Referring to the flow diagram of FIG. 12, models of the input and the output color spaces, 100 and 102, are formed for an input color space 96 and an output color space 98, respectively, to relate the input and the output color values to a standard color space. In box 104 the neutral input color values are extracted from the input color space. In box 106 a plurality of highly saturated input color values are extracted from the input color space. Boxes 108 and 110 form transformations of the input color values extracted by boxes 104 and 106, respectively, to the desired output color values. Box 112 forms the transform 114 from the remaining input color values using the transforms of boxes 108 and 110 as boundary values and the models of the input and the output color spaces 100 and 102.

Figure 13:
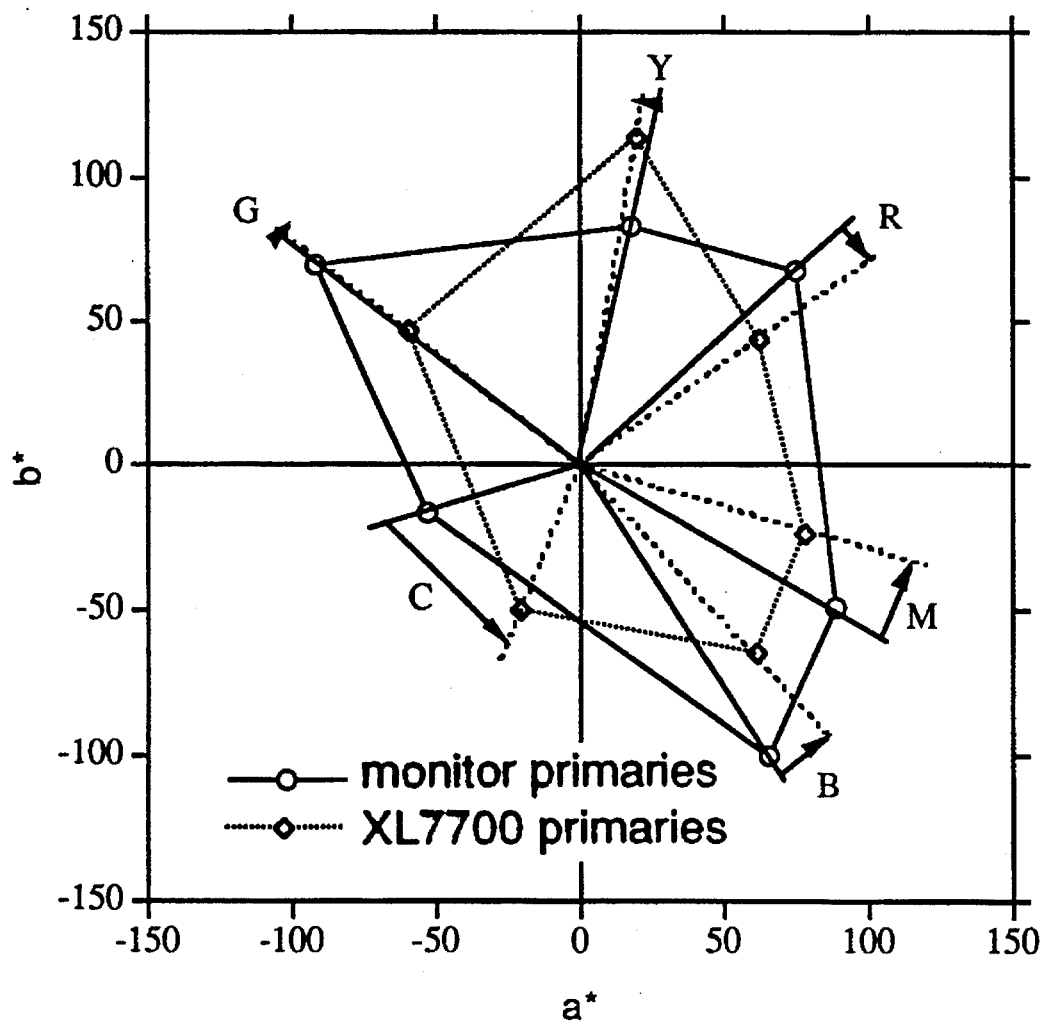
FIG. 13 is a graph comparing the a* and b* values in the CIELAB color space for an RGB video monitor and the Kodak XL7700 printer.
Figure 14:
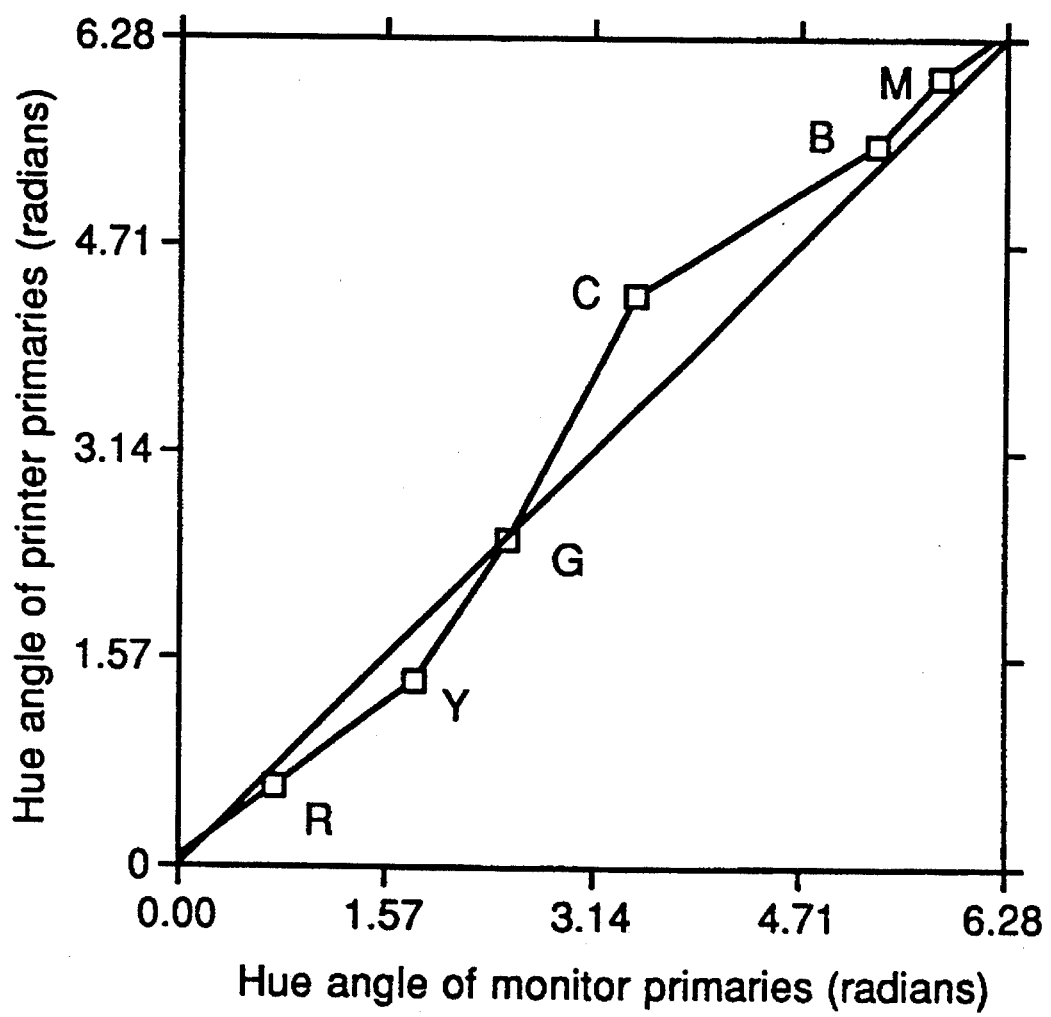
FIG. 14 is a graph showing the hue angle of the primary colors for the output device (Kodak XL7700 printer), as a function of the hue angle of the primary colors for the input device (RGB video monitor).
Figure 15:
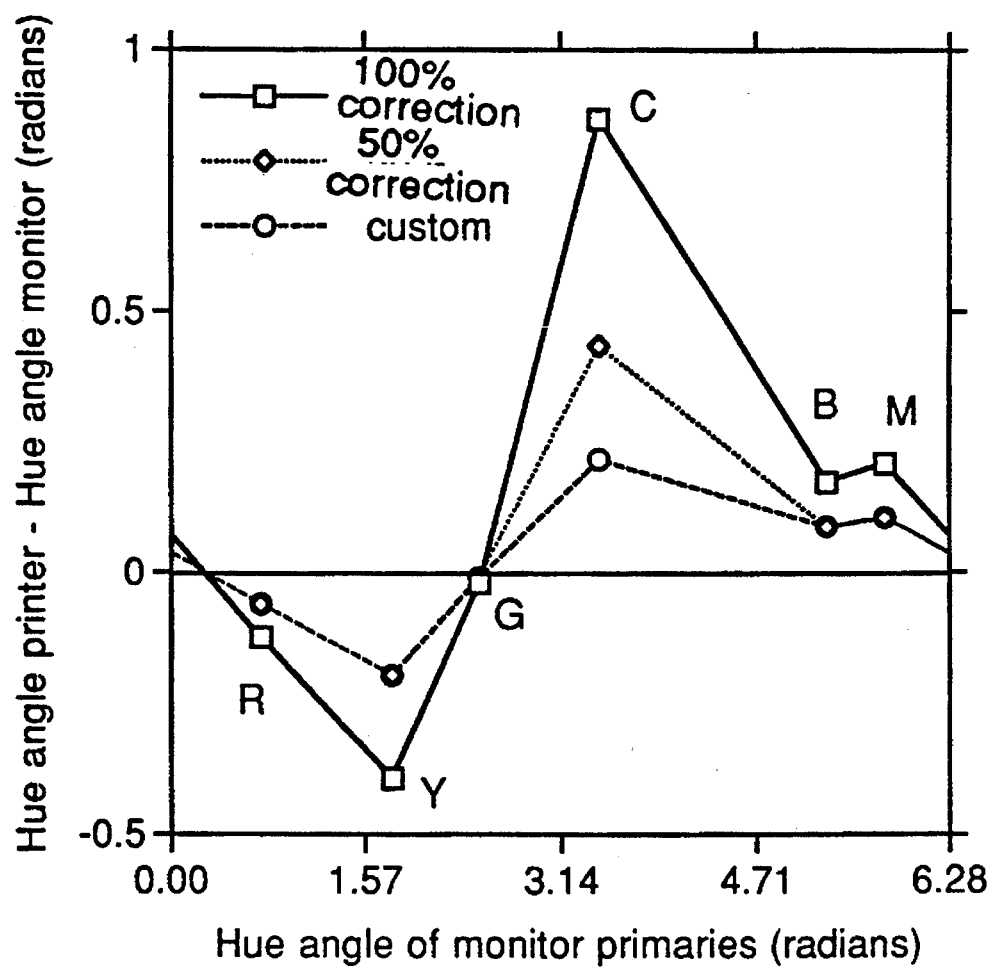
FIG. 15 is a graph showing the hue angle difference between the output device (Kodak XL7700 printer) and the input device (RGB video monitor) as a function of the input hue angle for each of the primary colors.

Consider FIG. 13 which shows the color coordinates of the six primary colors for two different color imaging devices. Specifically, the devices which are illustrated are a typical RGB video monitor, and a Kodak XL7700 dye sublimation thermal printer. It can be seen from this figure that there are substantial hue and saturation differences between the primary colors of the two devices. There are also lightness differences which will be addressed later. In order to transform the saturated colors of the input device to saturated colors on the output device it is desirable to transform the primary colors of the input device to, or toward, the primary colors of the output device. FIG. 14 shows a plot of the hue angles (relative to the positive a* axis) of the primary colors for the output device as a function of the hue angles of the primary colors for the input device. Similarly, the solid curve in FIG. 15 shows the difference between the input and output hue angles for each of the primary colors. To transform the input primaries to the output primaries, the hue angle shift indicated by this difference must be applied to the input color values. For input colors with hue angles between the hue angles of the input primary colors, hue angle shifts can be interpolated between the input primary colors using linear interpolation or other interpolation techniques. An advantage of using a generalized color transforming approach such as this, is that intermediate levels of correction can be used just as easily as the full amount of correction. For example, it is possible to shift the hue angles of the input primaries only halfway to those of the input primaries. This is illustrated by the dotted line in FIG. 15. Additionally, it is possible to adjust the hue shift for one of the primaries without affecting the hue of the other colors. For example, the dashed line in FIG. 15 represents 25% correction for the hue angle of the Cyan primary, and 50% correction for the others. By using the hue angle shifts for the primary colors as knobs, we have essentially 6 degrees-of-freedom for adjusting the hue. Additional degrees-of-freedom could be added by specifying the hue angle shift for additional input hue angles, or even by specifying some continuous function. Generally, this hue adjustment step can be represented by the functional relationship:

$$\theta_{OUT} = \theta_{in} + \Delta\theta(\theta_{in}) , \qquad (3)$$

where $\theta_{in}$ and $\theta_{out}$ are the input and output hue angles, respectively, and $\Delta\Theta(\Theta_{in})$ is the hue shift as a function of the input hue angle. For the case of specifying the hue shifts for the input primary colors, Eq. (3) can be expressed by:

$$\theta_{out} = \theta_{in} + \text{interpolate } (\theta_{in}, \theta_p, \Delta\theta_p), \qquad (4)$$

where $\theta_p$ is vector containing the hue angle of the primary colors in the input color space, $\Delta\theta_p$ is a vector containing the specified hue angle shifts for each primary, and interpolate() is an interpolation function which returns the hue angle shift for $\theta_{in}$ by interpolating between the hue angle shifts, $\Delta\theta_p$, specified for the hue angles of the input primaries, $\theta_p$. The interpolation function could represent linear interpolation, cubic spline interpolation, or some other interpolation technique. The most general form of Eq. (3) would be one where the output hue angle is a function of not only the input hue angle, but also the input lightness and saturation:

$$\theta_{out} = \theta_{in} + \Delta\theta(L_{in}^*, C_{in}^*, \theta_{in}). \tag{5}$$

For example, it might be desirable to apply little or no hue shifts to the desaturated colors to maintain colorimetric reproduction in the center of the gamut overlap region, and apply larger hue shifts to the increasingly saturated colors. It might also be desirable to make the amount of hue angle shift a function of the input lightness.

Figure 16:
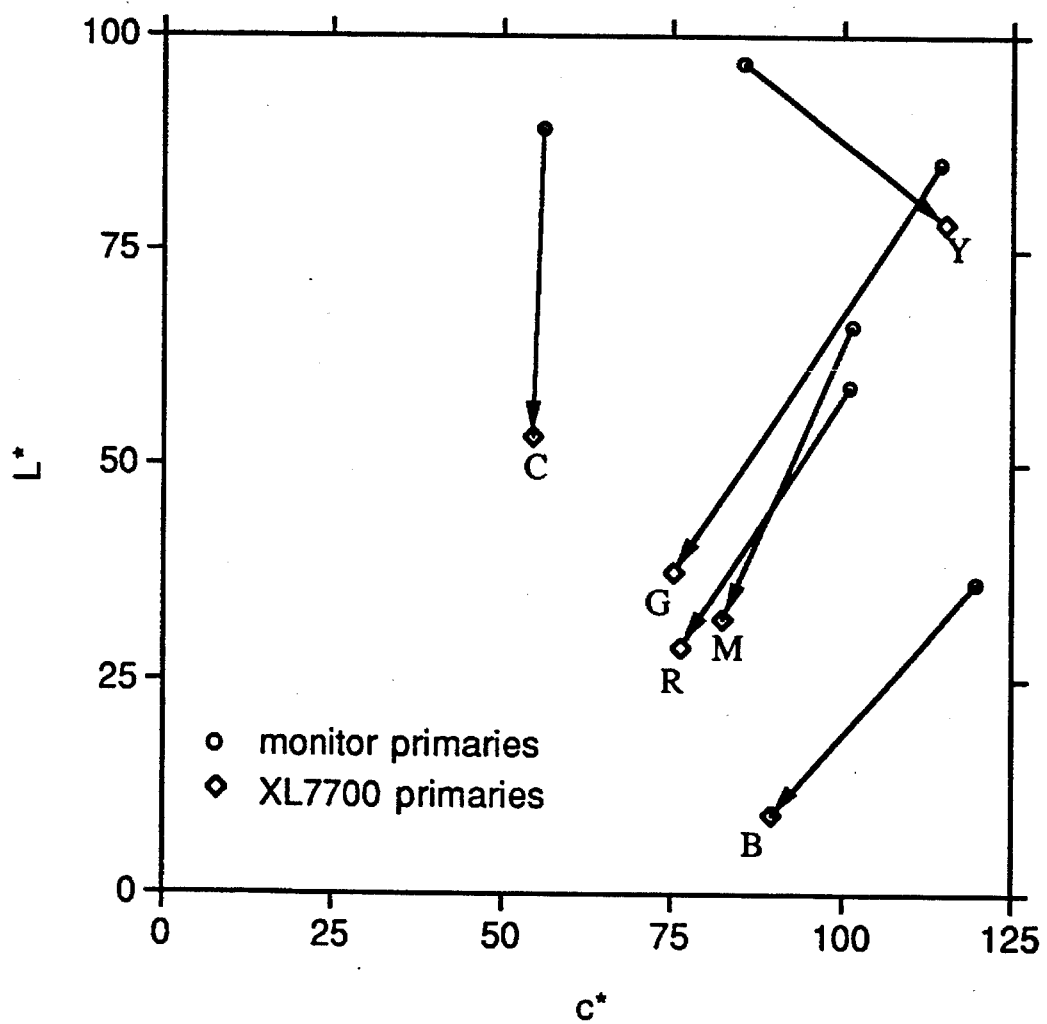
FIG. 16 is a graph showing the lightness and saturation differences between the primary colors of an RGB video monitor and the Kodak XL7700 printer.

In addition to the differences between the hue angles for the primary colors, there will also be differences between the saturation and lightness values of those colors for the input and output devices. This is shown in FIG. 16 for the same example shown in FIG. 13. It can be seen that there are very substantial differences between the saturation and lightness for each of the primary colors. In order to transform the most saturated colors in the input color space to the most saturated colors in the output color space, the saturation and lightness of the input primaries must, in general, be transformed to, or toward, that of the output primaries. To preserve continuity of colors in color space, the lower saturation colors will also have to be moved in some way so as to maintain smooth color gradations.

Figure 1:
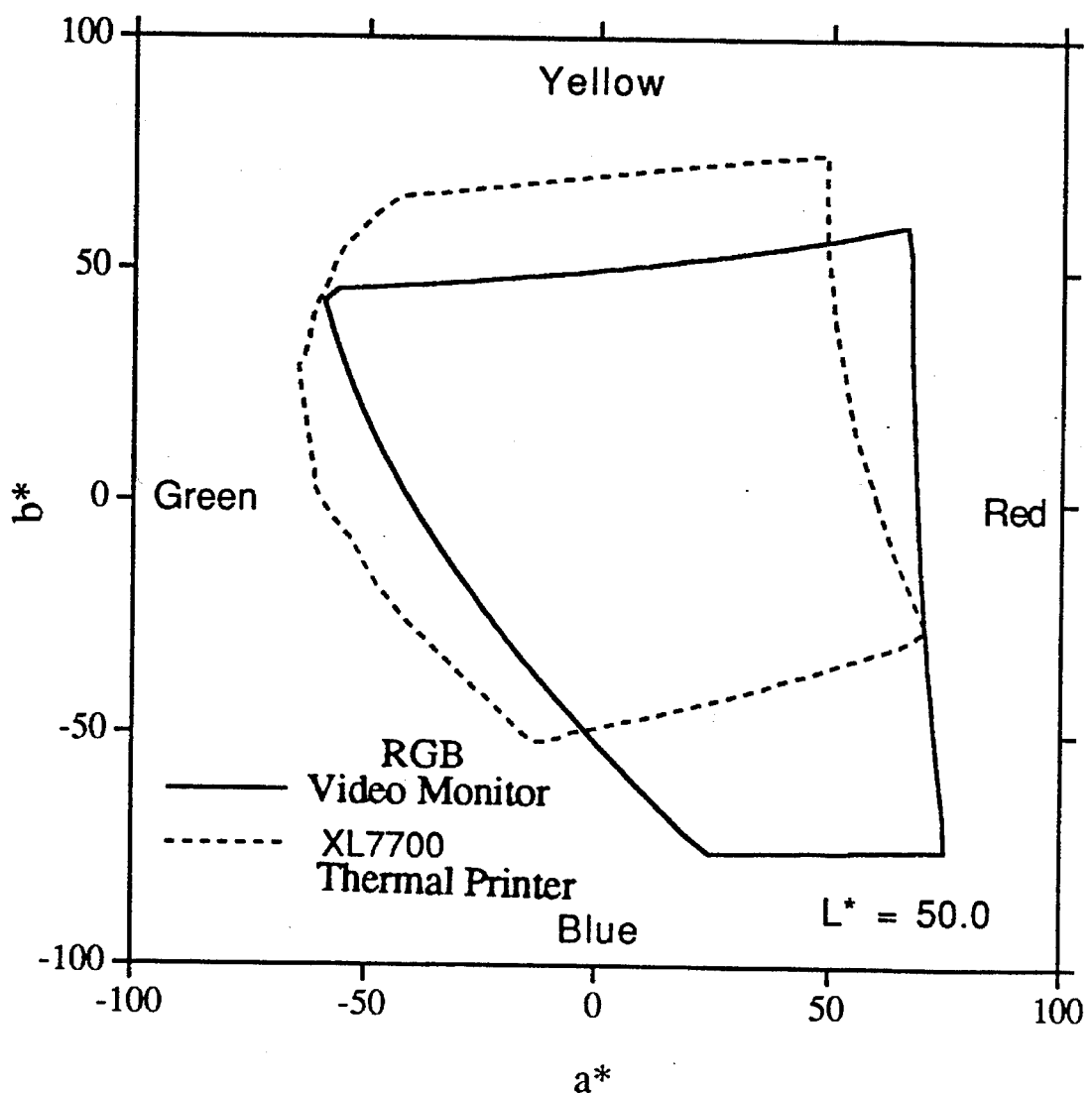
FIG. 1 is a plot showing the difference between the color gamuts for a typical video monitor and a Kodak XL7700 thermal printer at a lightness of L*=50.0.
Figure 2:
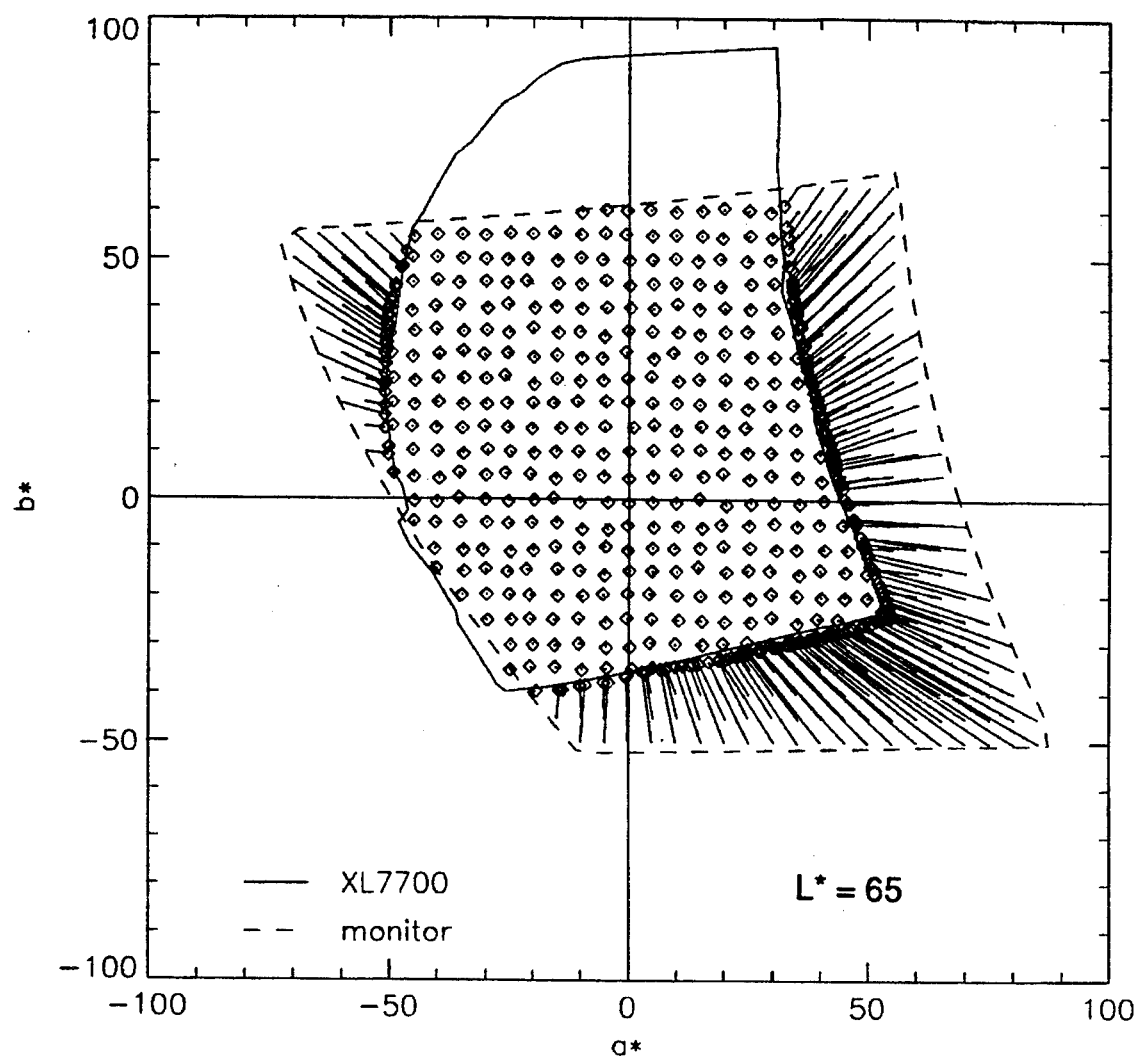
FIG. 2 is a plot showing the transforming of colors in the input video monitor gamut into colors in the Kodak XL7700 printer gamut using a conventional colorimetric transforming at a lightness of L*=65.0.
Figure 3:
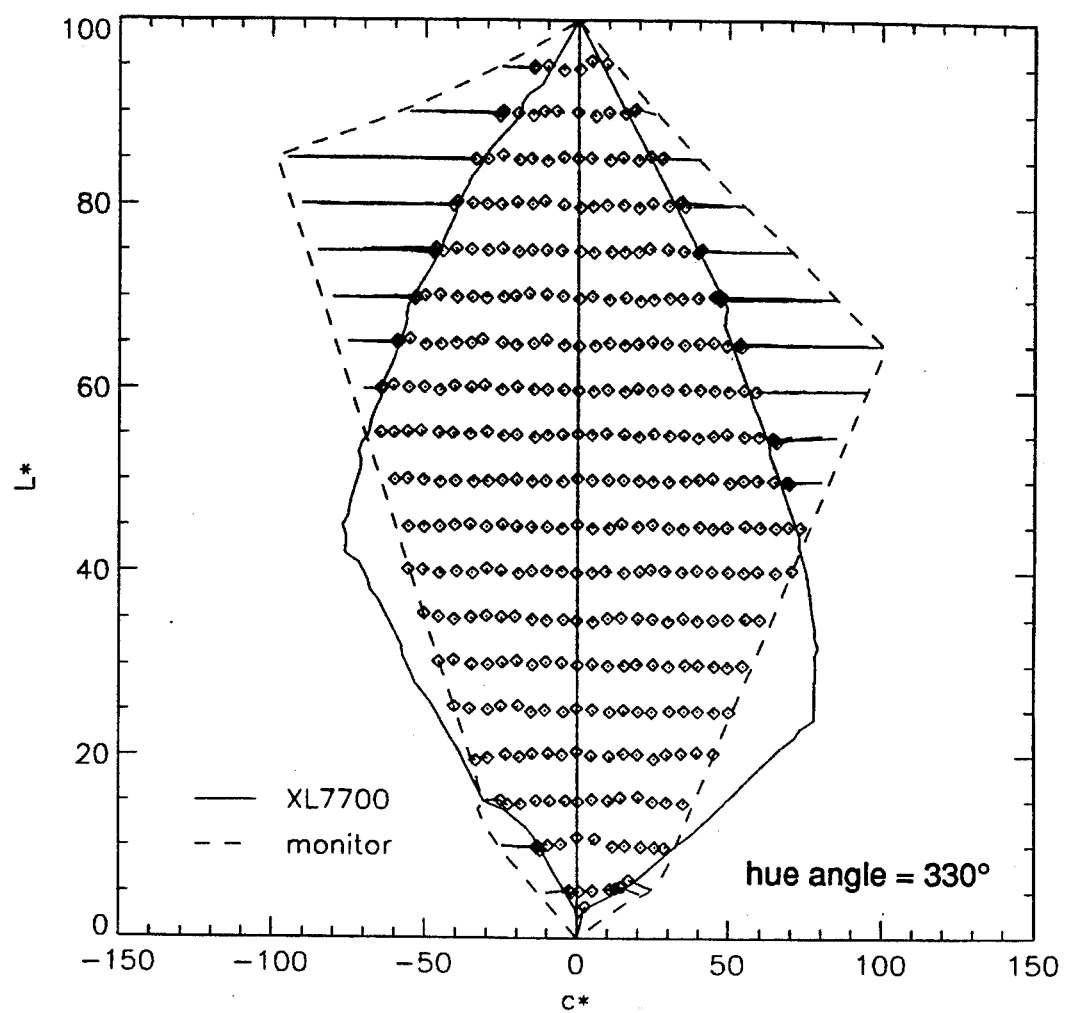
FIG. 3 is a plot showing the transforming of colors in the input video monitor gamut into colors in the Kodak XL7700 printer gamut using a conventional colorimetric transforming at a hue angle of 330°.
Figure 17:
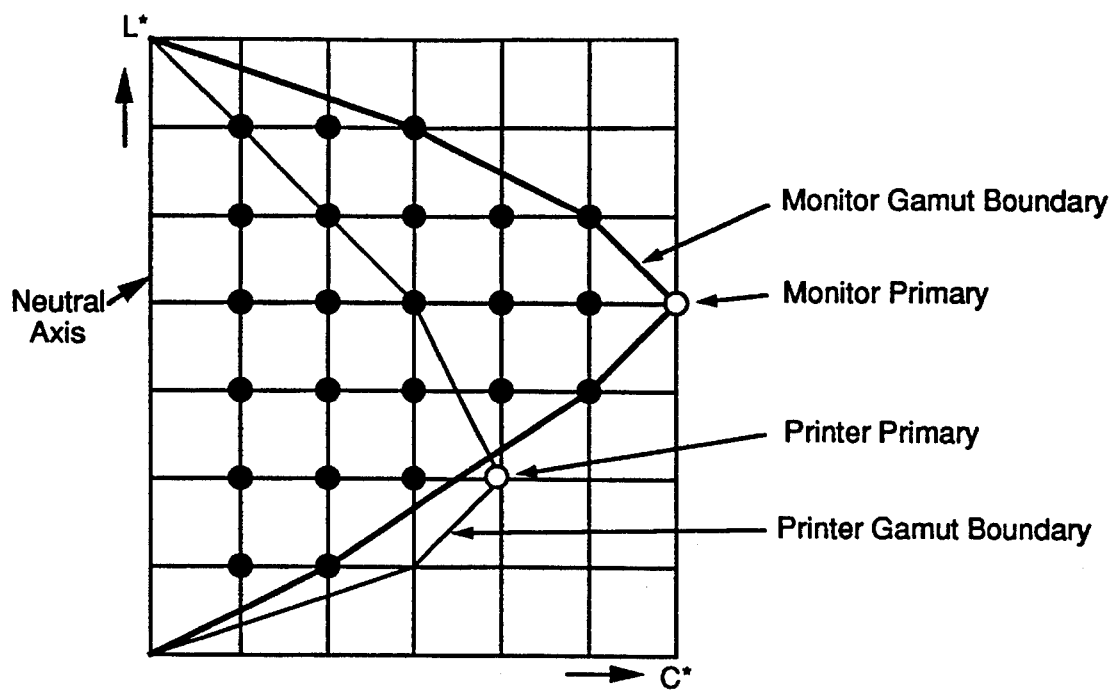
FIG. 17 is a diagram showing a grid of lightness and saturation values at a hue angle corresponding to some input primary. The gamut boundaries of hypothetical input and output devices are also shown.
Figure 18:
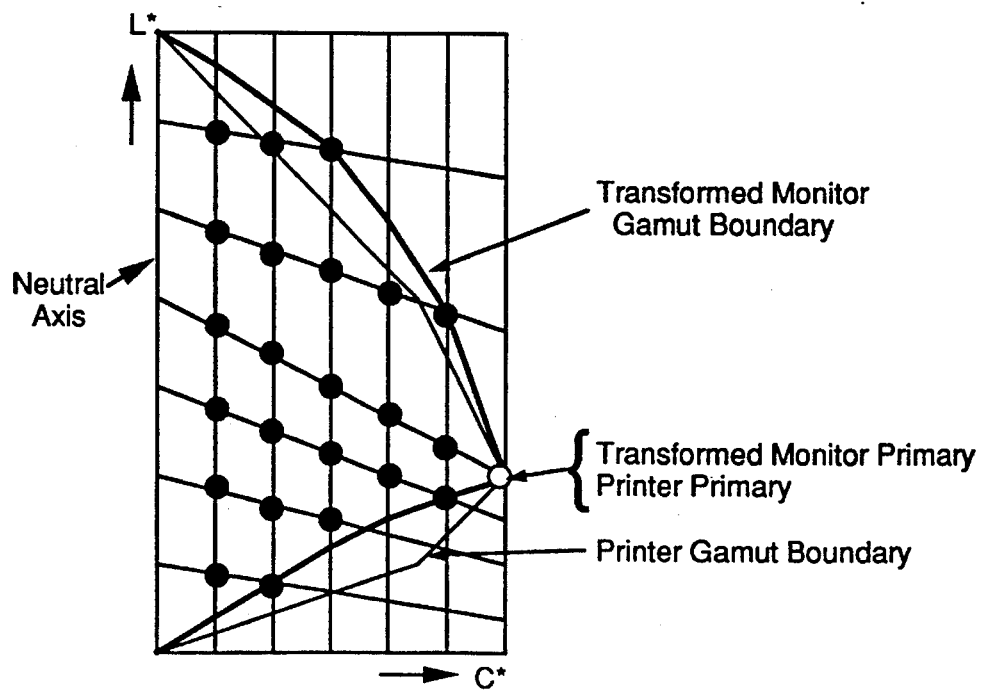
FIG. 18 is a diagram showing the saturation compression and lightness shear necessary to transform the input primary to the output primary in FIG. 15.

FIG. 17 shows a grid of lightness and saturation values at some specific hue angle corresponding to one of the primary colors. The solid curve represents the gamut boundary of a hypothetical input device at that hue angle. The actual color of the primary corresponds to the most saturated point on the gamut boundary. Also shown in this figure is the gamut boundary for a hypothetical output device at the hue angle corresponding to the same primary. In this case the output primary has a lower amount of saturation and a lower lighteness value than the input primary. Therefore, in order to transform the most saturated input colors to the most saturated output colors, it is necessary to introduce some kind of saturation compression, and a drop in lightness for the saturated colors. In general, however, it would not be desirable to change the tone reproduction of the neutral axis. (Any lightness reproduction changes for the neutral colors would generally be introduced prior to the color saturated transformation.) One way to accomplish the desired color transformation would be to uniformly compress the saturation, and to introduce a lightness shear as shown in FIG. 18. The lightness values at the neutral axis are unchanged with this scheme. Near the primary color, the lightnesses are compressed below the primary, and expanded above the primary. The lightness changes are then tapered back to the neutral axis. Since the amount of lightness and saturation difference will be different for each primary, the amount of saturation compression (or expansion) and lightness shear must also be different for each primary. As with the hue angle shifts, the amount of lightness and saturation changes can be chosen to fully transform the input primaries to the output primaries, or alternatively, a smaller (or larger) amount of correction can be specified. Additionally, the corrections can be specified individually for each of the primary colors. For the colors which occur at hue angles which are intermediate to the primary colors, interpolation can be used to determine the amount of lightness and saturation change which is appropriate. There is no guarantee that all of the input colors will be transformed to output colors inside the output color gamut after the color transforming process. This can be seen from FIG. 18 where several grid points which were inside the input color gamut remain outside the output gamut after the saturation and lightness correction has been applied. This will be particularly true if only a fraction of the full correction is used. In such cases, some clipping must be applied to bring the colors inside the output gamut using a technique such as the one used in FIGS. 2 and 3.

In general, the saturation correction will be a function of the input color value $$C_{out}^* = C_{in}^* + \Delta C^*(L_{in}^*, C_{in}^*, \theta_{in}). \tag{6}$$

For the specific implementation shown in FIG. 18, this relationship would be given by $$C_{out}^* = C_{in}^* + f_C \cdot \text{interpolate}(\theta_{in}, \theta_p, \Delta C_p^*), \tag{7}$$

where $\Delta C_p^*$ is a vector containing the saturation differences specified for each of the input primary colors, and the quantity

---

APPENDIX A

```
% - Copyright 1992 Eastman Kodak Company
/KOALA_2_MORPH52_15.CRD <<
/ColorRenderingType 1
/WhitePoint [0.9505 1.0 1.0890] % D65 illuminant
/MatrixPQR [      0.40024  -0.22630  0.00000
                  0.70760   1.16532  0.00000
                 -0.08081   0.04570  0.91822 ] % Cone primaries for
D65 (Hunt & Pointer)
/RangePQR [-0.75  2.5  -0.75  2.5  -0.75  2.5]
/TransformPQR    [{exch pop exch 3 get mul exch pop exch 3 get div} bind
                  {exch pop exch 4 get mul exch pop exch 4 get div} bind
                  {exch pop exch 5 get mul exch pop exch 5 get div} bind ]
/EncodeLMN [{.9505 div dup 0.008856 le (7.787 mul 16 116 div
add} {.3333333 exp
} ifelse} bind
            {1      div dup 0.008856 le {7.787 mul 16 116 div
add} {.3333333 exp
} ifelse{ bind
                   {1.089 div dup 0.008856 le {7.787 mul 16 116 div
add} {.3333333 exp
} ifelse}bind]
```

-continued

APPENDIX A

```
/MatrixABC [0  500  0  116  −500  200  0  0  −200]
/EncodeABC [{16 sub 100 div} bind
            {120 add 240 div} bind
            {120 add 240 div} bind]
/RangeABC [0 1 0  1 0 1]
/Tf_Lut0
<000000000000000001010202030304050506070708090090a0b0b0c0d0e0e
...
efeff0f1f2f3f4f5f6f7f8f9fafbfdff>
/Tf_Lut1
<00000000000000000000010101020203030304040505050606070708080809
...
ebedeeeff0f1f3f4f5f6f8f9fafcfdff>
/Tf_Lut2
<00000000000000000101020203030304040505050606070708080900a0a
...
edeff0f1f2f3f4f6f7f8f9fafbfdfeff>
/RenderTable [
15 15 15 % Table dimensions
[ % Interpolation table
<0042bf0041a6003f8d043b71053a56003a41003f22003e06003e06003e06
...
257fff257fff257fff257fff257ffff53d9ff54acff4d8cff456aff3334ff
2616ff2616>
] % End interpolation table
3
{KOALA_2_MORPH52_15.CRD /Tf_Lut0 get exch 255.0 mul 0.5 add
cvi get 255.0 div}
bind
{KOALA_2_MORPH52_15.CRD /Tf_Lut1 get exch 255.0 mul 0.5 add
cvi get 255.0 div}
bind
{KOALA_2_MORPH52_15.CRD /Tf_Lut2 get exch 255.0 mul 0.5 add
cvi get 255.0 div}
bind
] % End RenderTable
>> % End color-rendering dictionary
``` is essentially the ratio of the input saturation to the maximum input saturation at that hue angle. In Eq. (9), $C_p^*$ is a vector of the saturation of each of the input primaries.

Likewise, the lightness correction can, in general, be expressed as a function of the input color value $$L_{out}^* = L_{in}^* + \Delta L^*(L_{in}^*, C_{in}^*, \theta_{in}). \tag{9}$$

For the implementation shown in FIG. 18, the output lightness value is given by $$L_{out}^* = L_{in}^* + f_{C^*} \cdot f_{L^*} \cdot \text{interpolate}(\theta_{in}, \theta_p, \Delta L_p^*), \tag{10}$$

where $\Delta L_p^*$ is a vector containing the lightness shifts specified for each of the input primary colors, and $f_{C^*}$ is given by Eq. (8). The quantity $f_{L^*}$ is given by $$f_{L^*} = \begin{cases} (L_{in}^* - L_{black}^*)/(L_c^* - L_{black}^*); & \text{if } L_{in}^* \leq L_c^* \\ (L_{white}^* - L_{in}^*)/(L_{white}^* - L_c^*); & \text{if } L_{in}^* > L_c^* \end{cases} \tag{11}$$

where $$L_c^* = \text{interpolate}(\theta_{in}, \theta_p, L_p^*), \tag{12}$$

and $L_p^*$ is a vector containing the lightness of the input primary colors.

Figure 19:
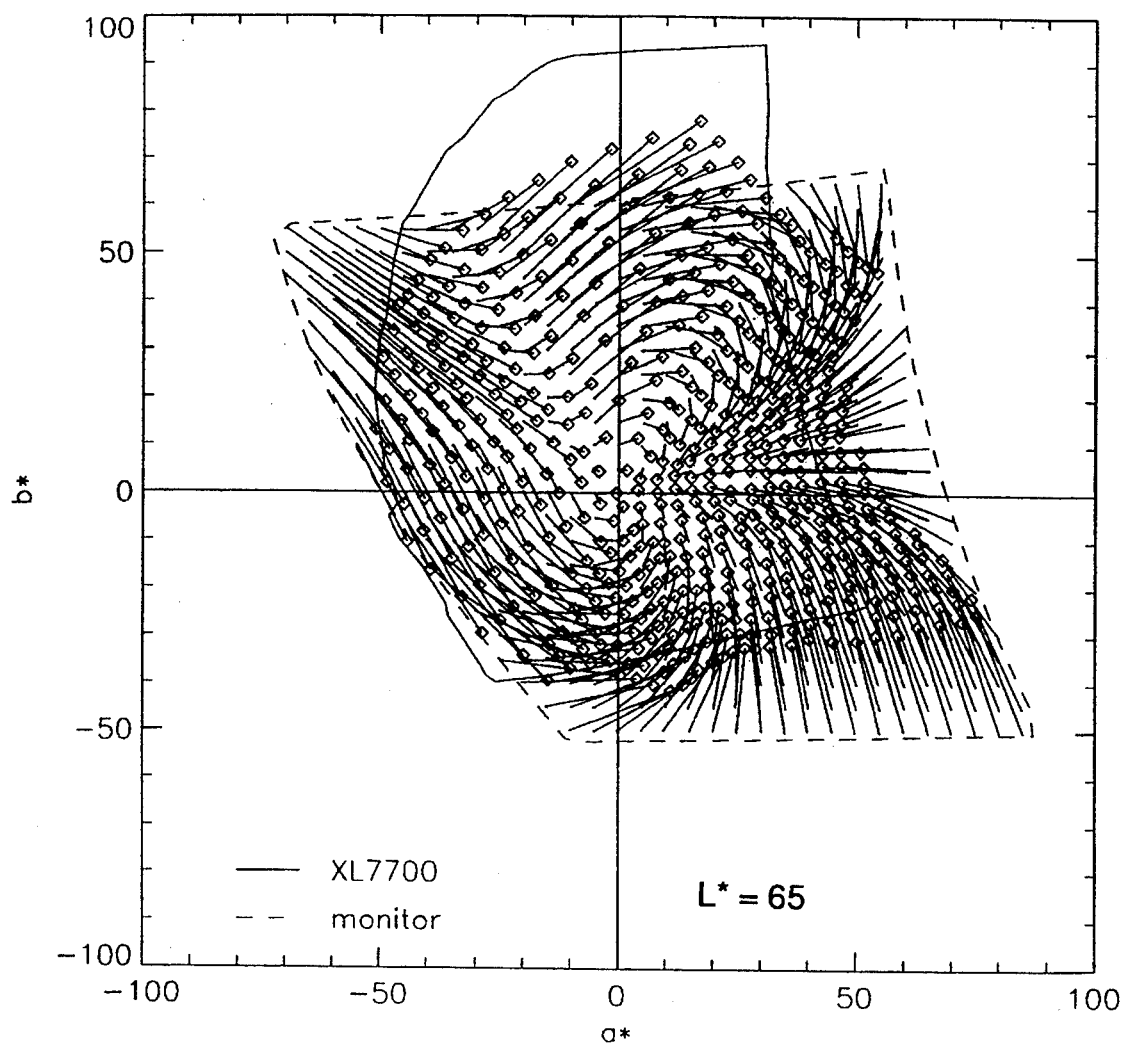
FIG. 19 is a plot showing the transforming of colors in the input video monitor gamut into colors in the Kodak XL7700 printer gamut using color transforming functions which transform the input primary colors to the output primary colors at a lightness of L*=65.0.
Figure 20:
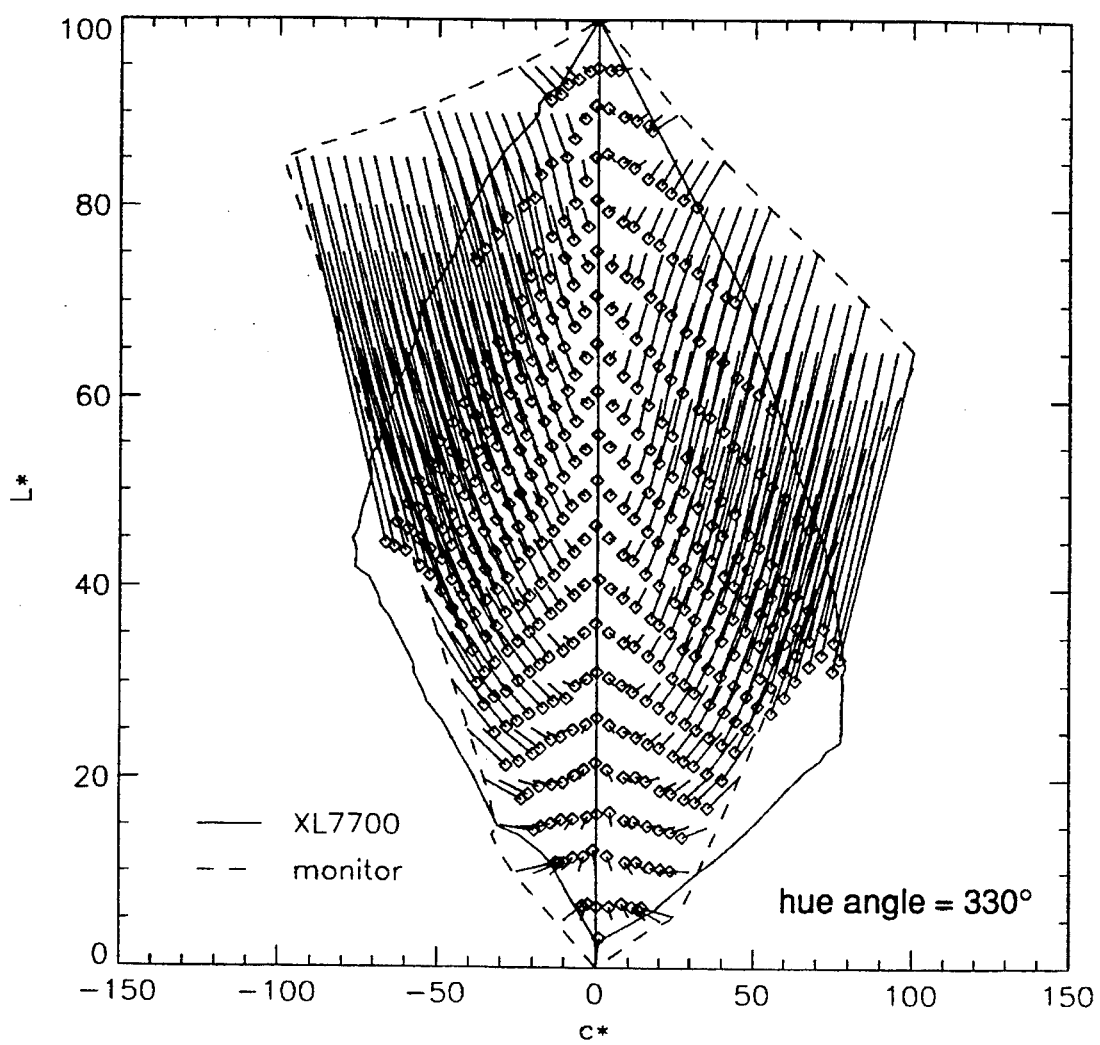
FIG. 20 is a plot showing the transforming of colors in the input video monitor gamut into colors in the Kodak XL7700 printer gamut using color transforming functions which transform the input primary colors to the output primary colors at a hue angle of 330°.
Figure 21:
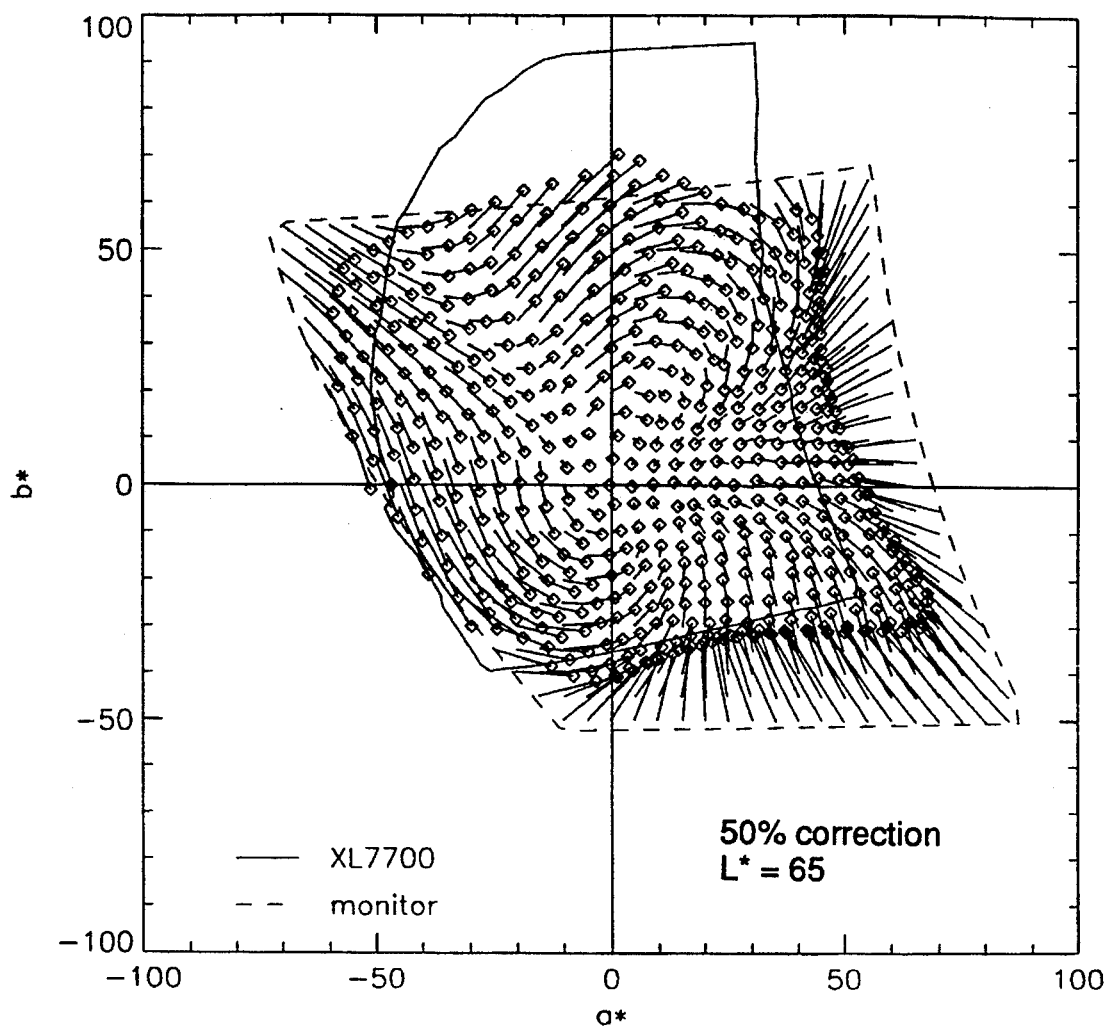
FIG. 21 is a plot showing the transforming of colors in the input video monitor gamut into colors in the Kodak XL7700 printer gamut using color transforming functions which transform the input primary colors halfway to the output primary colors at a lightness of L*=65.0.
Figure 22:
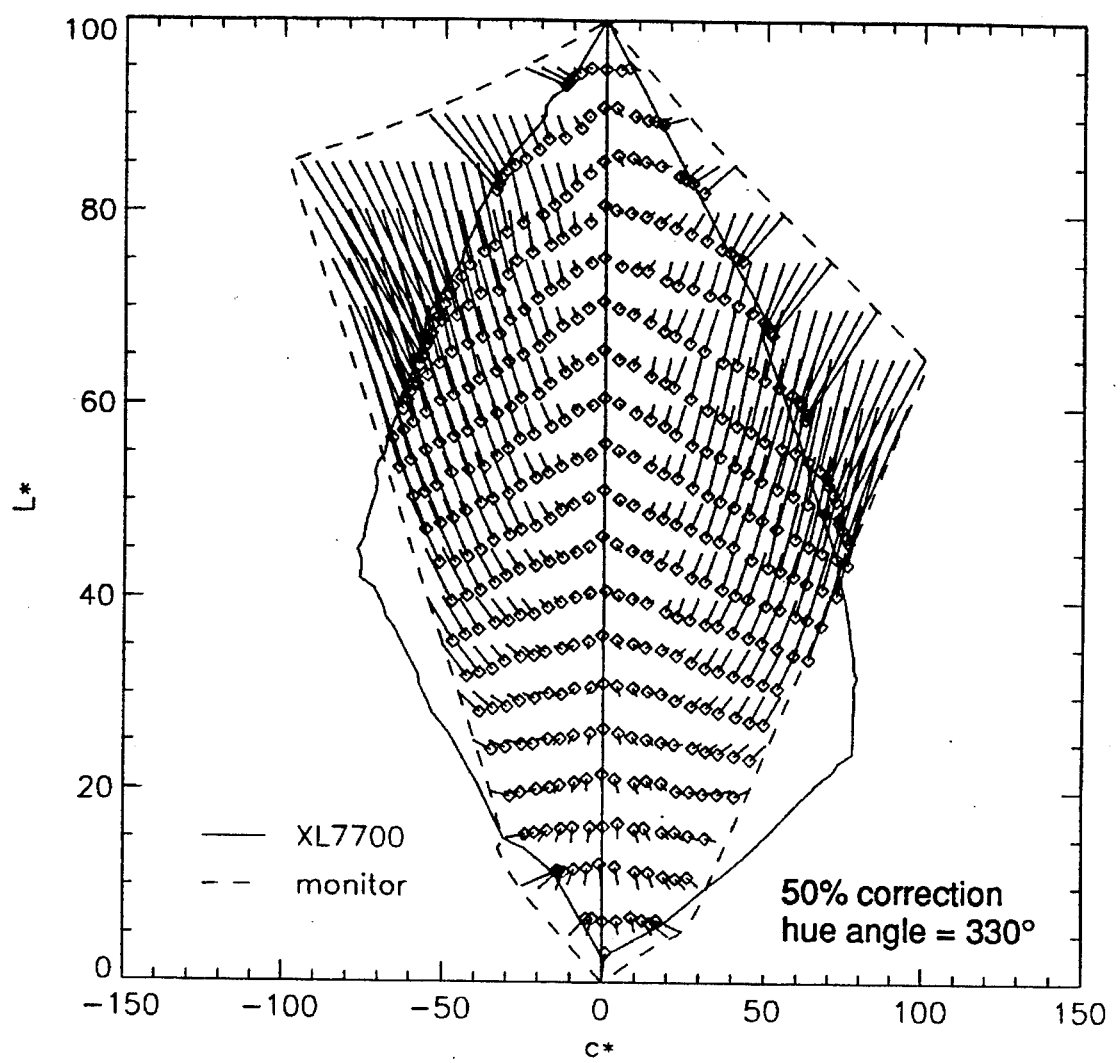
FIG. 22 is a plot showing the transforming of colors in the input video monitor gamut into colors in the Kodak XL7700 printer gamut using color transforming functions which transform the input primary colors halfway to the output primary colors at a hue angle of 330°.

Color error maps that show the color transforming that is obtained using this approach for the case of transforming the input primaries all the way to the output primaries are shown in FIGS. 19 and 20. The hue rotations can be seen from the "swirls" in FIG. 19, and the lightness and saturation distortions can clearly be observed in FIG. 20. It is apparent that the most saturated input colors have indeed moved to the most saturated output colors, and that the neutral axis has remained unchanged (aside from an overall compression of the L* values to transform the input Black point to the output Black point that was introduced prior to applying the transforming functions to the input color values). Similar plots are show in FIGS. 21 and 22 for the case of 50% correction. It can be seen that the color shifts here are essentially halfway between those in FIGS. 19 and 20, and the colorimetric transforming shown in FIGS. 2 and 3.

In the previous examples shown in FIGS. 19–22, all of the "knobs" were adjusted together, but in the preferred embodiment of this invention, the hue, saturation and lightness shifts for each of the six primary colors can be individually adjusted giving 18 degrees of freedom. The ability to adjust each of the primary colors individually allows for the alteration of one region of color space without affecting other regions. This is a large advantage relative to the conventional approach shown in FIG. 4. For example if the Yellow primary of the output device is substantially more orange than the Yellow primary of the input device, it might be desirable to adjust the color shift in such a way that the "color name" does not change. Or if the Blue primary of the output device is darker than is desired, the lightness shift for the Blue primary can be adjusted to produce the best compromise between saturation and lightness. As mentioned above, additional degrees of freedom can be added by specifying control points for intermediate hue angles or using the more generalized functions given in Eqs. (5), (6), and (9) to permit color changes to be even more localized.

Since it is primarily the highly saturated colors which create the need for using some kind of a color transforming function, it is usually desirable to maintain colorimetric reproduction for the desaturated colors which are near the center of the overlap regions for the input and output gamuts. The above examples illustrated in FIGS. 19–22 show that colorimetric reproduction is only maintained for colors on the neutral axis. The hue, saturation and lightness of colors which are quite close to the neutral axis are still changed proportionally due to the linear taper of the color shifts. This effect can be modified by simply using some other form for the taper, such as a quadratic function, etc. For example, the color transforming functions in Eqs. (4), (7), and (10) can be modified to include an extra factor of $f_{C*}$ in the correction term:

$$\theta_{out} = \theta_{in} + f_{C*} \cdot \text{interpolate}(\theta_{in}, \theta_p, \Delta\theta_p), \quad (13)$$

$$C_{out}^* = C_{in}^* + f_{C*}^2 \cdot \text{interpolate}(\theta_{in}, \theta_p, \Delta C_p), \quad (14)$$

$$L_{out}^* = L_{in}^* + f_{C*}^2 f_L \cdot \text{interpolate}(\theta_{in}, \theta_p, \Delta L_p^*). \quad (15)$$

Figure 23:
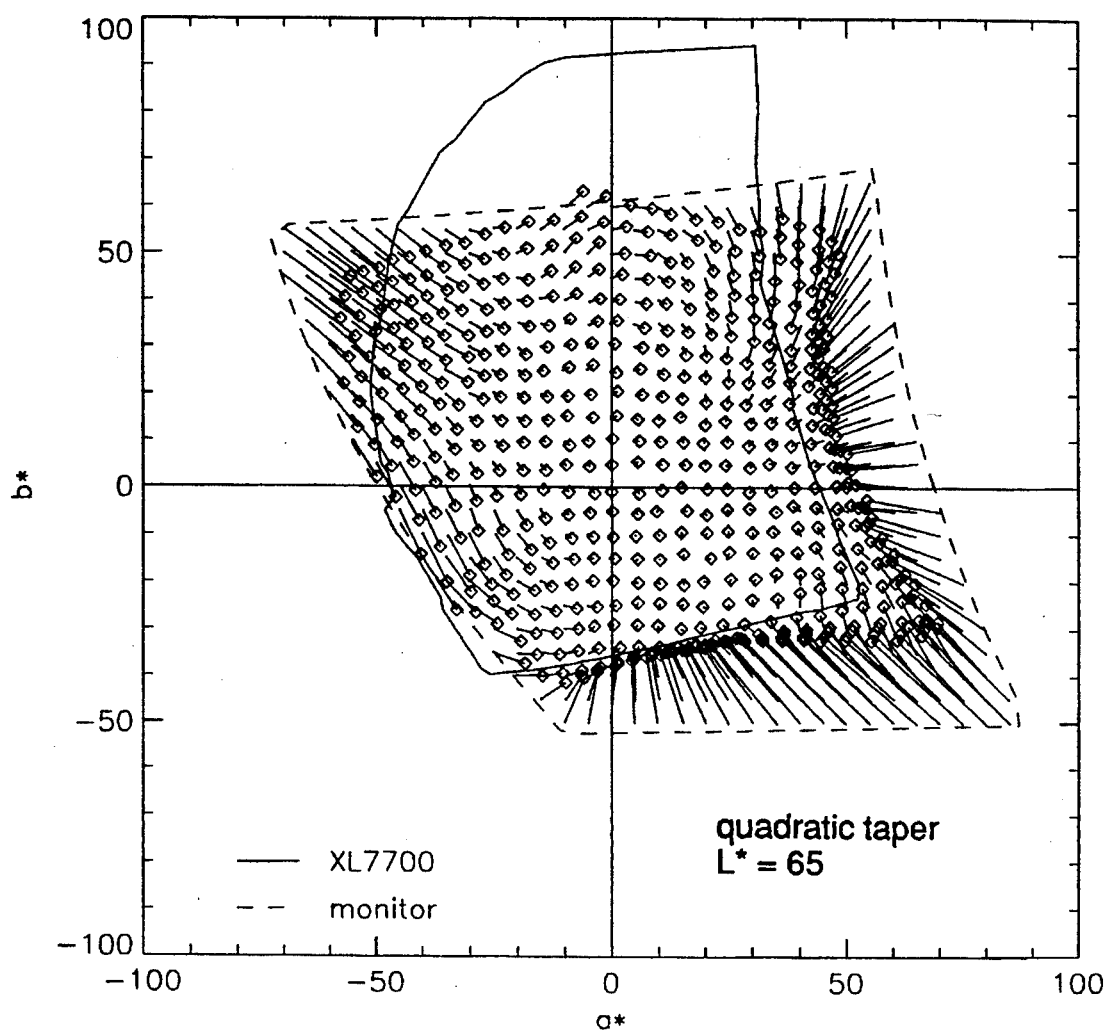
FIG. 23 is a plot showing the transforming of colors in the input video monitor gamut into colors in the Kodak XL7700 printer gamut using custom color transforming functions with a quadratic taper at a lightness of L*=65.0.
Figure 24:
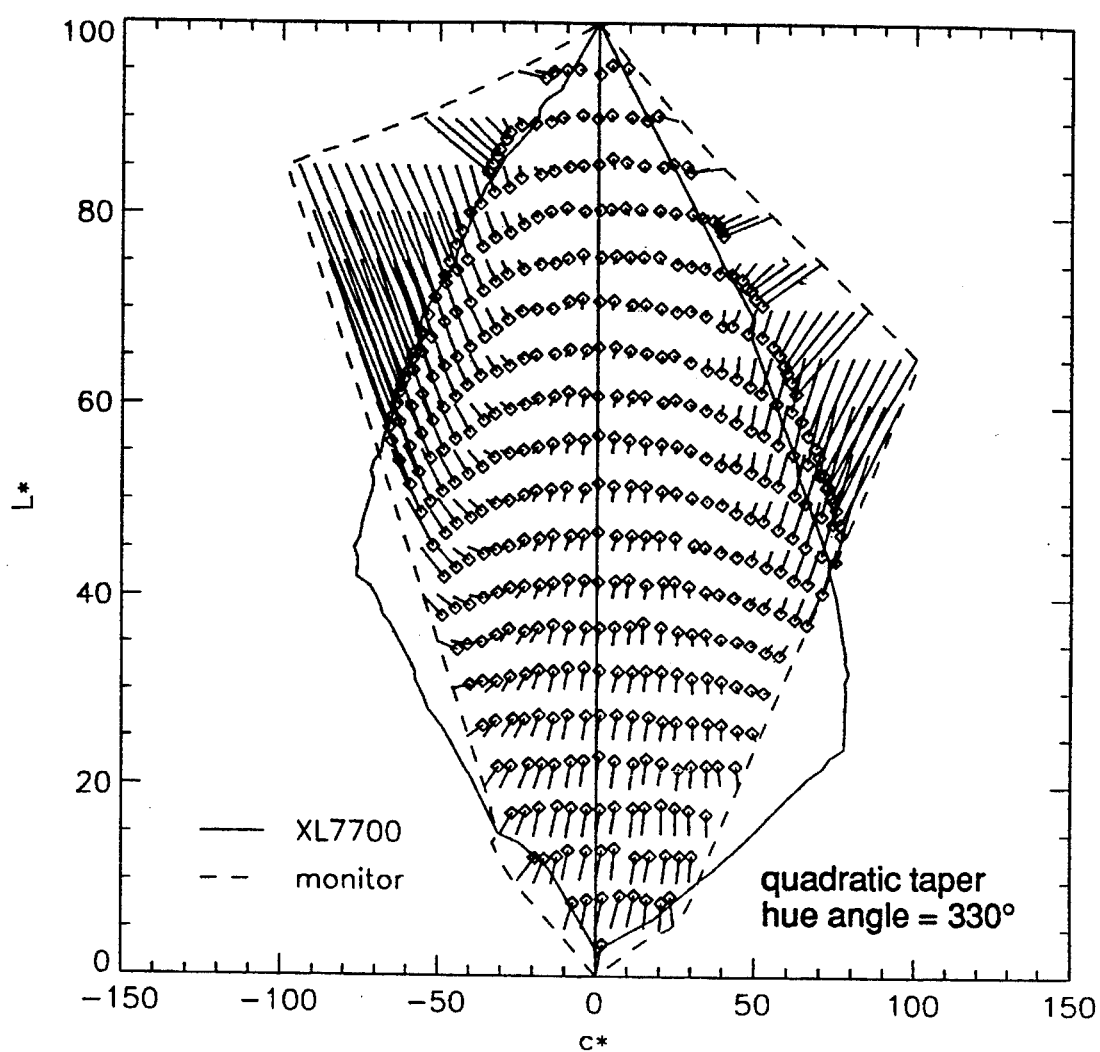
FIG. 24 is a plot showing the transforming of colors in the input video monitor gamut into colors in the Kodak XL7700 printer gamut using custom color transforming functions with a quadratic taper at a hue angle of 330°.

This has the effect of reducing the size of the color changes for colors with lower saturation values. FIGS. 23 and 24 show color error maps corresponding to this approach where each of the hue, saturation, and lightness changes for each primary have been adjusted independently. It can be seen for this example that the color shifts for the colors near the neutral axis are much smaller than those in the linear taper examples.

The various color transforming methods described by this invention could be implemented by processing the input color values through a digital processor which performs the method steps of the present invention to provide the correct output color for each of the input colors in an image, or by using the color transforming functions to load up a multi-dimensional look-up table which is then used to process the image. The preferred implementation is determined by available processing speed and hardware requirements for the particular application.

Figure 25:
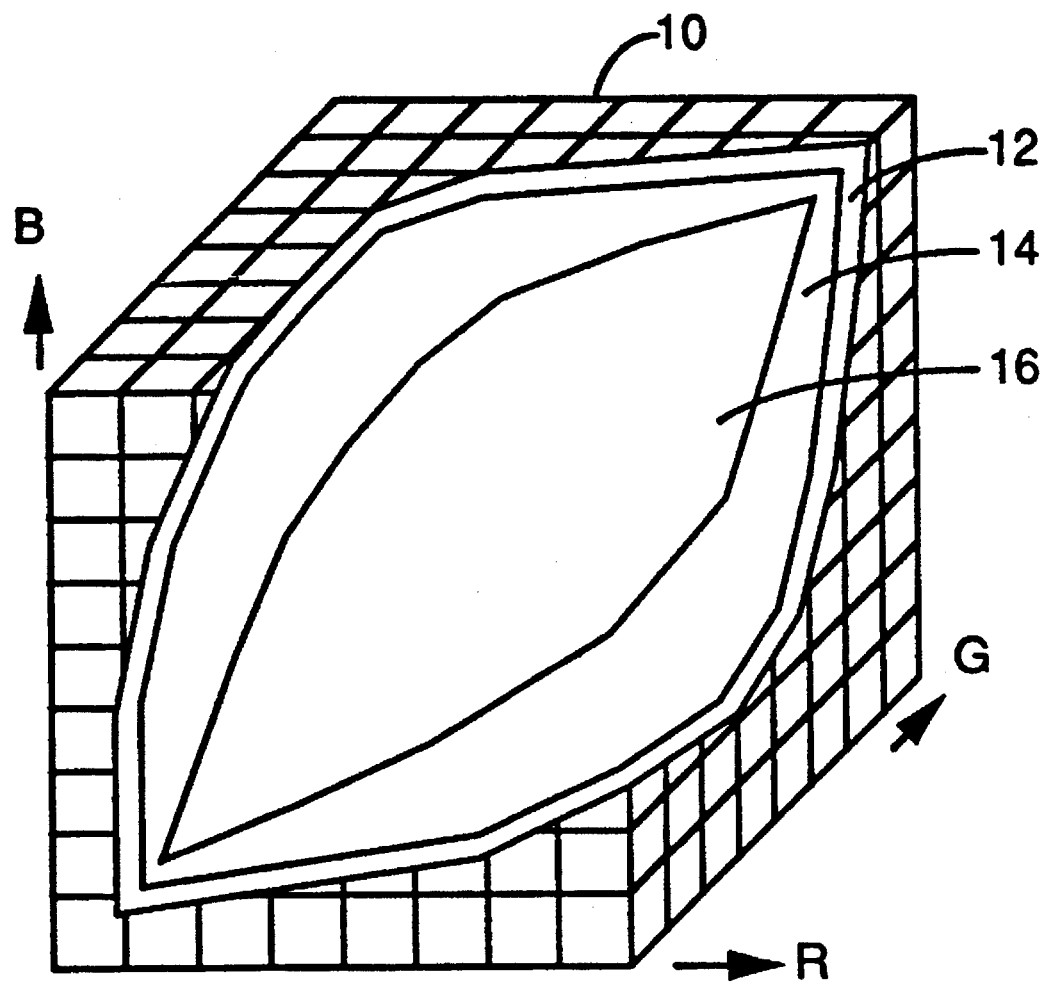
FIG. 25 is a cut-away perspective view of an input RGB color space segmented into three subsets.

Referring to FIG. 25, an RGB input color space 10 is divided into three subsets. Subset 12 is the collection of the most saturated color values. Subset 16 is a collection of relatively unsaturated color values of the type commonly found in photographic scenes. A color enhancement strategy is assigned to subset 12 which performs a mapping of input colors to saturated colors in the output color space. A strategy for mapping input colors to output colors colorimetrically is applied to subset 16. The remaining colors forming subset 14 are mapped in a manner preserving continuity between the subsets 12 and 16.

Appendix A is a color rendering dictionary for a POSTSCRIPT level 2 implementation of a 3D look-up table for a transform from CIELAB input color space to a CMY output color space. The table was constructed using the method of the present invention and corresponds to the transform 114 in FIG. 12. It is to be understood that a large number of look-up table and interpolation table entries have been omitted to simplify the listing. Ellipses have been used to represent the location of omitted entries.

APPENDIX A

```
% - Copyright 1992 Eastman Kodak Company
/KOALA_2_MORPH52_15.CRD <<
/ColorRenderingType 1
/WhitePoint [0.9505 1.0 1.0890] % D65 illuminant
/MatrixPQR [        0.40024  -0.22630  0.00000
                    0.70760   1.16532  0.00000
                   -0.08081   0.04570  0.91822 ] % Cone primaries for
D65 (Hunt & Pointer)
/RangePQR [-0.75 2.5 -0.75 2.5 -0.75 2.5]
/TransformPQR    [{exch pop exch 3 get mul exch pop exch 3 get div} bind
                  {exch pop exch 4 get mul exch pop exch 4 get div} bind
                  {exch pop exch 5 get mul exch pop exch 5 get div} bind ]
/EncodeLMN [{.9505 div dup 0.008856 le {7.787 mul 16 116 div
add} {.3333333 exp
} ifelse} bind
           {1     div dup 0.008856 le {7.787 mul 16 116 div
add} {.3333333 exp
} ifelse{ bind
                  {1.089 div dup 0.008856 le {7.787 mul 16 116 div
add} {.3333333 exp
} ifelse}bind]
/MatrixABC [0  500  0  116  -500  200  0  0  -200]
/EncodeABC [{16 sub 100 div} bind
            {120 add 240 div} bind
            {120 add 240 div} bind]
/RangeABC [0 1 0  1 0 1]
/Tf_Lut0
<000000000000000001010202030304050506070708090090a0b0b0c0d0e0e
...
efeff0f1f2f3f4f5f6f7f8f9fafbfdff>
/Tf_Lut1
<00000000000000000000010101020203030304040505060607070808909
...
ebedeeeff0f1f3f4f5f6f8f9fafcfdff>
/Tf_Lut2
<0000000000000000000101020203030304040505050606070708080900a
...
edeff0f1f2f3f4f6f7f8f9fafbfdfeff>
/RenderTable [
15 15 15 % Table dimensions
[ % Interpolation table
<0042bf0041a6003f8d043b71053a56003a41003f22003e06003e06003e06
...
```

APPENDIX A

```
257fff257fff257fff257fff257ffff53d9ff54acff4d8cff456aff3334ff
2616ff2616>
] % End interpolation table
3
{KOALA_2_MORPH52_15.CRD /Tf_Lut0 get exch 255.0 mul 0.5 add
cvi get 255.0 div}
bind
{KOALA_2_MORPH52_15.CRD /Tf_Lut1 get exch 255.0 mul 0.5 add
cvi get 255.0 div}
bind
{KOALA_2_MORPH52_15.CRD /Tf_Lut2 get exch 255.0 mul 0.5 add
cvi get 255.0 div}
bind
] % End RenderTable
>> % End color-rendering dictionary
```

What is claimed:

1. A method for transforming input color values in an input color space to output color values in an output color space, comprising the steps of:
    a) forming a transform for only the input color values that are neutral;
    b) forming a transform for transforming a plurality of highly saturated input color values to specified desired output color values, said plurality of highly saturated input color values being less than all of the highly saturated input color values;
    c) forming a transform of the remaining colors using as boundary values the transform for input color values that are neutral, as formed in step a), and the transform for the highly saturated input color values, as formed in step b); and
    d) transforming input color values in the input color space to output color values in the output color space using the transforms formed in steps a), b), and c).

2. The method according to claim 1 wherein the input color space is a device-dependent color space.

3. The method according to claim 1 wherein the output color space is a device-dependent color space.

4. The method according to claim 1 wherein step a) includes transforming the neutral input color values in the input color space to the output color values in the output color space having the same lightness values in a device-independent color space.

5. The method according to claim 1 wherein step a) includes transforming the neutral input color values in the input color space to the output color values in the output color space incorporating a specified tone reproduction curve for the lightness values.

6. The method according to claim 1 wherein the transform for the remaining colors, as formed in step c), further includes the step of interpolating between the transform of the highly saturated input color values and the transform of the input color values that are neutral.

7. The method according to claim 1 wherein step d) includes the step of generating a look-up table incorporating the transform formed in step c).

8. A method for transforming input color values in a device-dependent input color space to output color values in a device-dependent output color space, comprising the steps of:
    a) forming a transform for only the input color values that are neutral;
    b) forming a transform for transforming a plurality of highly saturated input color values to specified desired output color values, said plurality of highly saturated input color values being less than all of the highly saturated input color values;
    c) forming a transform of the remaining colors using as boundary values the transform for input color values that are neutral, as formed in step a), and the transform for the highly saturated input color values, as formed in step b); and
    d) transforming input color values in the device-dependent input color space to output color values in the device-dependent output color space using the transforms formed in steps a), b), and c).

9. The method according to claim 8 wherein the input device-dependent color space is a Red, Green, and Blue color space.

10. The method according to claim 8 wherein the output device-dependent color space is a Cyan, Magenta, and Yellow, or Cyan, Magenta, Yellow, and Black color space.

11. The method according to claim 8 wherein the highly saturated input color values in step b) are the primary colors of the input device.

12. The method according to claim 11 wherein the primary colors of the input device are the Red, Green, Blue, Cyan, Magenta, and Yellow colors formed by single and double combinations of the device colorants.

13. The method according to claim 11 wherein the primary colors of the input device are transformed to the corresponding primary colors of the output device.

14. The method according to claim 13 wherein the primary colors of the input and output devices are the Red, Green, Blue, Cyan, Magenta, and Yellow colors formed by single and double combinations of the device colorants.

15. The method according to claim 8 wherein the transform for the remaining colors, as formed in step c), further includes the step of interpolating between the transform of the highly saturated input color values and the transform of the input color values that are neutral.

16. The method according to claim 8 wherein step d) includes the step of generating a look-up table incorporating the transform formed in step c).

17. Apparatus for transforming input color values in an input color space to output color values in an output color space, comprising:
    a) means for forming a first transform for only the input color values that are neutral;
    b) means for forming a second transform for transforming a plurality of highly saturated input color values to specified desired output color values, said plurality of highly saturated input color values being less than all of the highly saturated input color values;

c) means for forming a third transform of the remaining colors using as boundary values said first transform for input color values that are neutral, and said second transform for the highly saturated input color values; and d) means for transforming input color values in the input color space to output color values in the output color space using said first, second, and third, transforms.

18. A storage means for storing a transform for transforming input color values in an input color space to output color values in an output color space wherein said transform comprises:

three transform components, one providing a transform strategy for only neutral colors, another providing a transform strategy for highly saturated colors that transforms a plurality of highly saturated input color values to specified desired output color values, said plurality of highly saturated input color values being less than all of the highly saturated input color values, and a third providing a transform strategy for the remainder.

19. The storage means according to claim 18 wherein at least one of said strategies for a transform includes a transform which is a colorimetric model.

20. The storage means according to claim 18 wherein at least one of said strategies for a transform includes a transform which is a model of a photographic process.

21. The storage means according to claim 18 wherein at least one of said strategies for a transform includes a transform which is a color enhancement strategy.

22. The storage means according to claim 18 wherein at least one of said strategies for a transform includes a transform which maintains continuity between the other transforms.

23. A method for transforming input color values in an input color space to output color values in an output color space, comprising the steps of:

a) forming a transform for the input color values that are neutral;

b) forming a transform for transforming a plurality of highly saturated input color values to specified desired output color values, said plurality of highly saturated input color values being less than all of the highly saturated input color values;

c) forming a transform of the remaining colors using as boundary values the transform for input color values that are neutral, as formed in step a), and the transform for the highly saturated input color values, as formed in step b); and d) transforming input color values in the input color space to output color values in the output color space using the transforms formed in steps a), b), and c).

24. Apparatus for transforming input color values in an input color space to output color values in an output color space, comprising:

a) means for forming a first transform for the input color values that are neutral;

b) means for forming a second transform for transforming a plurality of highly saturated input color values to specified desired output color values, said plurality of highly saturated input color values being less than all of the highly saturated input color values;

c) means for forming a third transform of the remaining colors using as boundary values said first transform for input color values that are neutral, and said second transform for the highly saturated input color values; and d) means for transforming input color values in the input color space to output color values in the output color space using said first, second, and third transforms.

25. A method for transforming input color values in an input color space to output color values in an output color space, comprising the steps of:

a) forming a transform for the input color values that are neutral;

b) forming a transform for transforming a plurality of highly saturated input color values to desired output color values, the transform for one of the saturated input color values being different from that for other saturated input color values;

c) forming a transform of the remaining colors using as boundary values the transform for input color values that are neutral, as formed in step a), and the transform for the highly saturated input color values, as formed in step b); and d) transforming input color values in the input color space to output color values in the output color space using the transforms formed in steps a), b), and c).

26. Apparatus for transforming input color values in an input color space to output color values in an output color space, comprising:

a) means for forming a first transform for the input color values that are neutral;

b) means for forming a second transform for transforming a plurality of highly saturated input color values to desired output color values, the transform for one of the saturated input color values being different from that for other saturated input color values;

c) means for forming a third transform of the remaining colors using as boundary values said first transform for input color values that are neutral, and said second transform for the highly saturated input color values; and d) means for transforming input color values in the input color space to output color values in the output color space using said first, second, and third transforms.

* * * * *